United States Patent
Smith

(10) Patent No.: US 10,656,276 B2
(45) Date of Patent: May 19, 2020

(54) SYSTEMS AND METHODS FOR INWARD-LOOKING DEPTH SCANNING OF A SCAN ZONE

(71) Applicant: Verizon Patent and Licensing Inc., Arlington, VA (US)

(72) Inventor: Steven L. Smith, Putnam Valley, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 381 days.

(21) Appl. No.: 15/663,719

(22) Filed: Jul. 29, 2017

(65) Prior Publication Data

US 2019/0033462 A1    Jan. 31, 2019

(51) Int. Cl.
| | | |
|---|---|---|
| *G01S 17/00* | (2020.01) | |
| *G01S 17/89* | (2020.01) | |
| *G06T 15/20* | (2011.01) | |
| *G06F 3/01* | (2006.01) | |
| *G01S 17/87* | (2020.01) | |

(52) U.S. Cl.
CPC .............. *G01S 17/89* (2013.01); *G01S 17/87* (2013.01); *G06F 3/011* (2013.01); *G06T 15/20* (2013.01)

(58) Field of Classification Search
None
See application file for complete search history.

(56) References Cited

U.S. PATENT DOCUMENTS

| | | | | |
|---|---|---|---|---|
| 6,714,236 | B1* | 3/2004 | Wada | G08B 13/1963 348/152 |
| 6,847,859 | B2* | 1/2005 | Nuebling | G01B 11/04 198/502.2 |
| 2003/0052971 | A1* | 3/2003 | Gutta | H04N 5/232 348/159 |
| 2007/0183770 | A1* | 8/2007 | Aoki | H04N 7/181 396/428 |
| 2008/0002176 | A1* | 1/2008 | Krasutsky | G01S 7/4811 356/4.01 |
| 2010/0141761 | A1* | 6/2010 | McCormack | H04N 5/23248 348/143 |
| 2017/0227629 | A1* | 8/2017 | Sorensen | G01G 19/083 |

FOREIGN PATENT DOCUMENTS

FR            3010221 A1 *    3/2015

\* cited by examiner

*Primary Examiner* — Hovhannes Baghdasaryan

(57) ABSTRACT

An exemplary depth scanning system includes first and second depth scanning devices disposed, respectively, at first and second locations on a boundary of a scan zone where segments of the boundary meet to form respective first and second angles that include the scan zone. The first device performs a first sequence of depth scanning operations where the first device detects depth data for surfaces included in the scan zone by sweeping a scan field across the first angle and in which the first device abstains from detecting depth data for surfaces outside the first angle. Concurrently, the second device performs a second sequence of depth scanning operations where the second device detects depth data for the surfaces in the scan zone by sweeping a scan field across the second angle and in which the second device abstains from detecting depth data for surfaces outside the second angle.

20 Claims, 17 Drawing Sheets

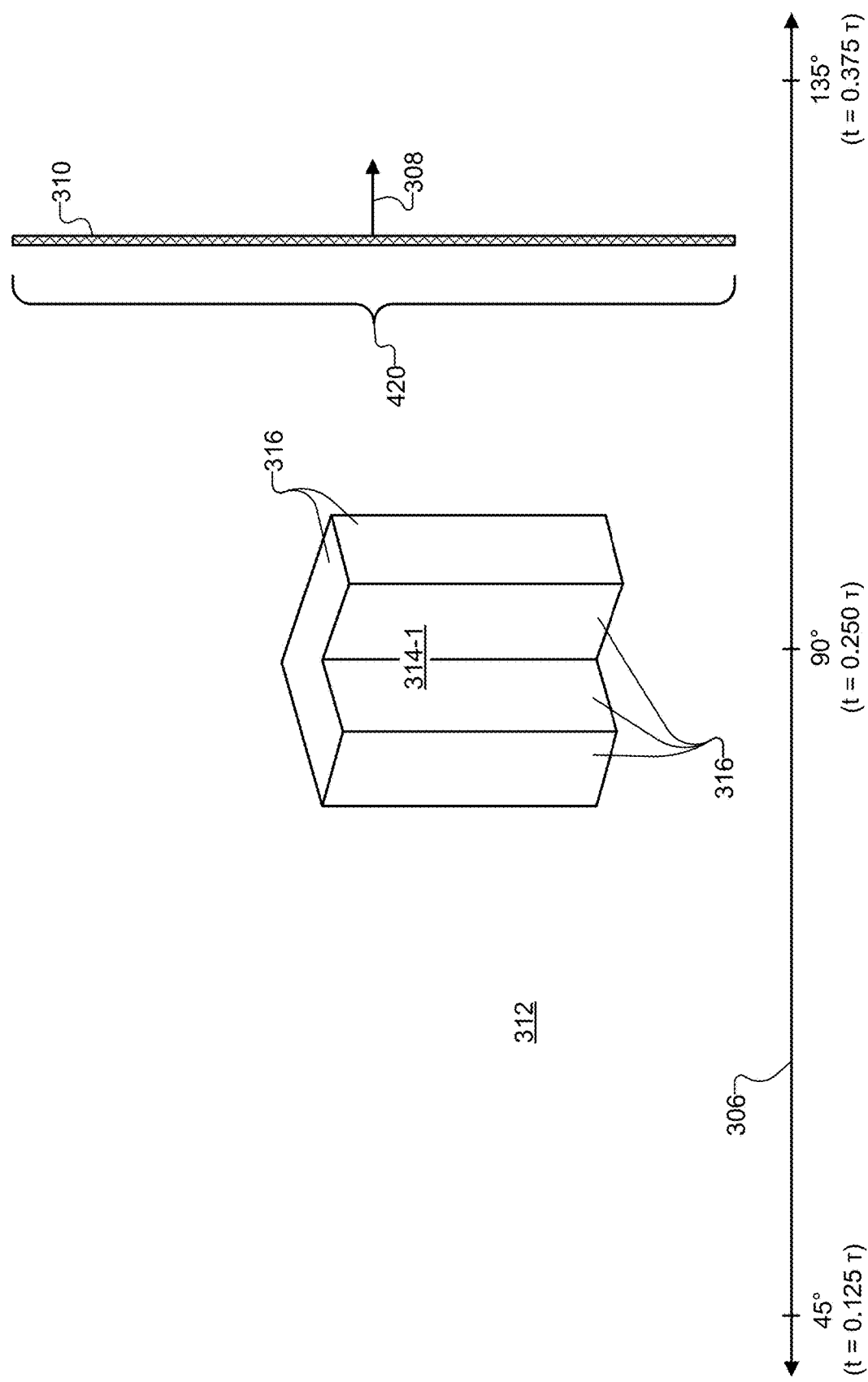

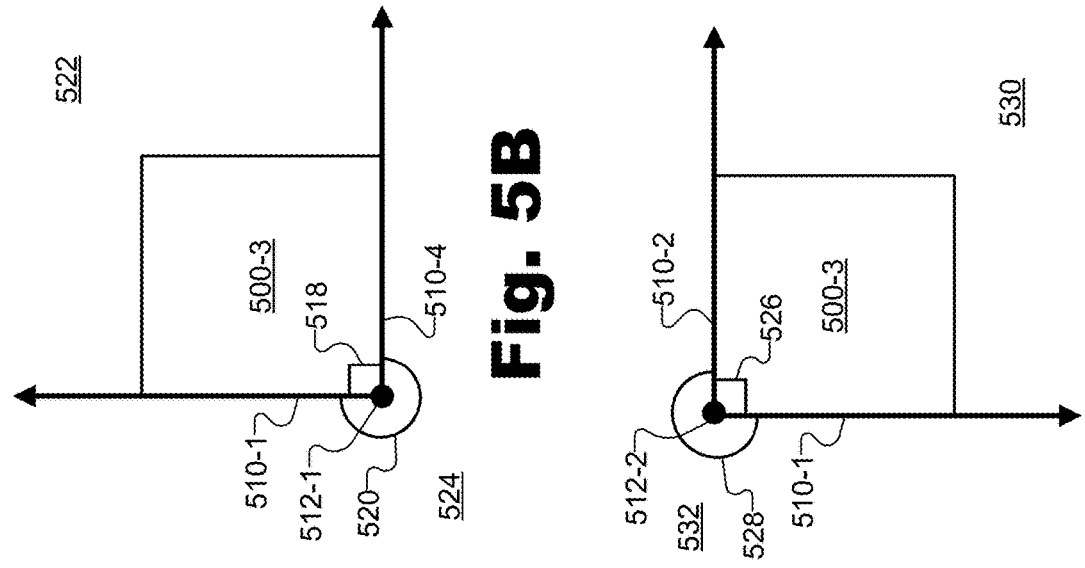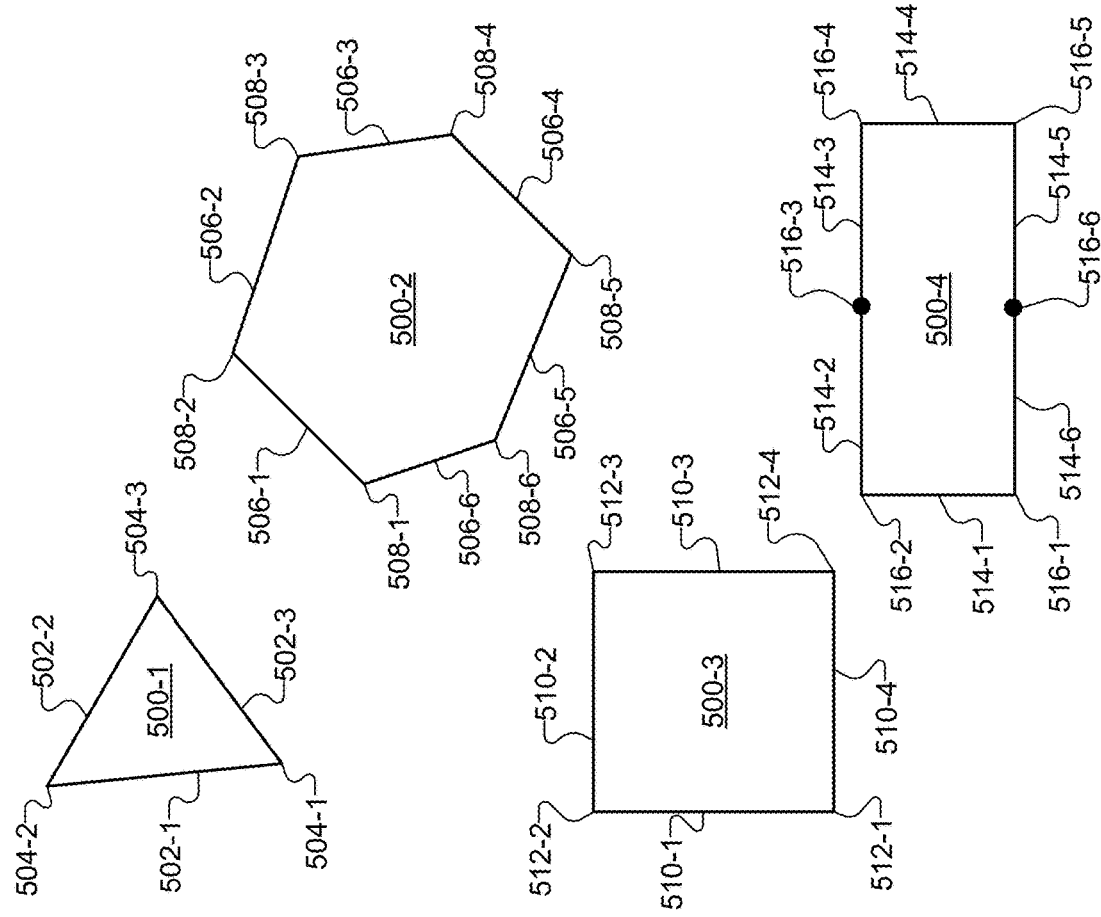

SYSTEMS AND METHODS FOR INWARD-LOOKING DEPTH SCANNING OF A SCAN ZONE

BACKGROUND INFORMATION

Depth data (e.g., spatial location data, positional coordinate data, etc.) for surfaces of objects in the world may be useful for detecting and/or modeling the objects for use in various applications. For example, depth data may be used in entertainment applications, automation applications (e.g., automated driving), educational applications, communication applications, vicarious experience/travel applications, and/or in connection with various other applications.

Virtual reality is one example of an application where users may experience (e.g., view, interact with, etc.) objects modeled using depth data. For instance, virtual reality media content may be used to immerse users (i.e., viewers of the virtual reality media content) into virtual reality worlds that the users may experience by directing their attention to any of a variety of things being presented in the virtual reality world at the same time. For example, at any time during the presentation of the virtual reality media content, a user experiencing the virtual reality world may look around in any direction, giving the user a sense that he or she is actually present in and experiencing the virtual reality world from a particular viewpoint or vantage point within the virtual reality world.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 4 illustrates a perspective view of a portion of the exemplary configuration illustrated in FIG. 3 according to principles described herein.

FIG. 5A illustrates a variety of exemplary scan zones for which inward-looking depth scanning may be performed according to principles described herein.

FIGS. 5B-5C illustrate exemplary angles that include one of the exemplary scan zones of FIG. 5A and are associated with locations at which depth scanning devices may be disposed according to principles described herein.

DETAILED DESCRIPTION OF PREFERRED EMBODIMENTS

Figure 1:
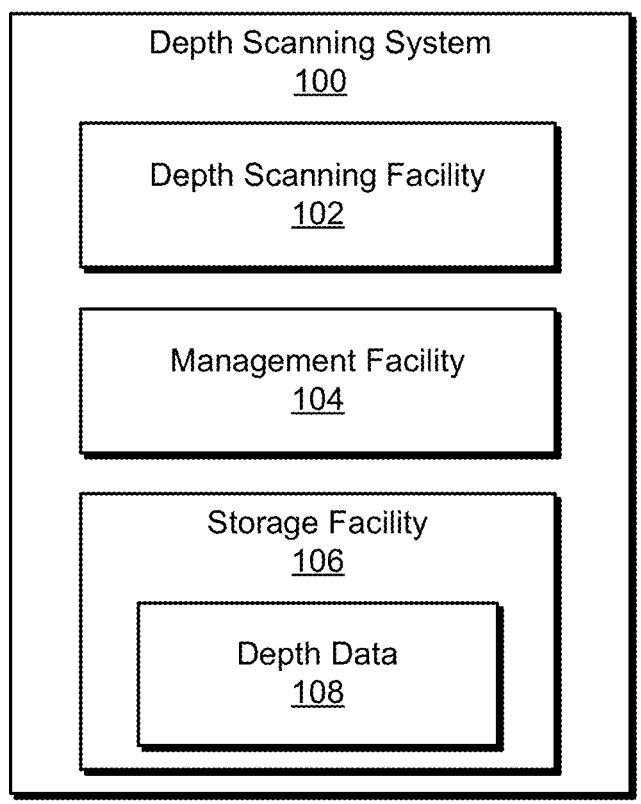
FIG. 1 illustrates an exemplary depth scanning system for inward-looking depth scanning of a scan zone according to principles described herein.

Systems and methods for inward-looking depth scanning of a scan zone are described herein. For example, as will be described in more detail below, one implementation may include a depth scanning system that includes a plurality of depth scanning devices configured to interoperate to perform the inward-looking depth scanning of the scan zone. More particularly, the depth scanning system may include at least a first depth scanning device and a second depth scanning device, as well as other similar depth scanning devices as may serve a particular implementation.

The first depth scanning device may have a first scan head and may be configured to be disposed on or near a boundary of a scan zone at a first location where a first pair of segments of the boundary meet to form a first angle that includes the scan zone. For example, if a scan zone is rectangular in shape, the first depth scanning device may be configured to be disposed at a corner of the rectangle of the scan zone such that the first angle is a 90° angle extending outward from the corner that includes (i.e., covers, incorporates, subtends, etc.) the entire rectangular scan zone and an area beyond the scan zone. The first depth scanning device may further be configured to perform a first sequence of depth scanning operations where the first depth scanning device detects (e.g., from a first vantage point of the first location) depth data for surfaces (e.g., physical surfaces of visible objects) included within the scan zone. For example, each depth scanning operation in the first sequence of depth scanning operations may be performed by rotating the first scan head to sweep a first scan field across the first angle (e.g., the 90° angle including the scan zone in the example given above).

In some examples, the first depth scanning device may abstain from detecting, during the performance of the first sequence of depth scanning operations, depth data for surfaces outside the first angle. For example, rather than continue to scan outside the first angle (e.g., to scan past 90° all the way around 360° in the example above), the depth scanning device may perform a technique to snap back to begin scanning again at the beginning of first angle, a technique to reverse rotational directions to scan back over the first angle, or another suitable technique that allows the first depth scanning device to efficiently spend scan time scanning an angle that includes the scan zone rather than an angle that does not include the scan zone.

The second depth scanning device may have a second scan head and may be configured to be disposed on the boundary of the scan zone at a second location where a second pair of segments of the boundary meet to form a second angle that includes the scan zone. For instance, in the example given above where the scan zone is rectangular in shape and the first depth scanning device is disposed at the corner of the rectangle, the second depth scanning device may be configured to be disposed at another corner of the rectangle of the scan zone (e.g., a corner adjacent to or opposite of the corner at which the first depth scanning device is disposed) such that the second angle is another 90° angle extending outward from the other corner that similarly includes (i.e., covers, incorporates, subtends, etc.) the entire rectangular scan zone and an area beyond the scan zone. The second depth scanning device may further be configured to perform, concurrently with the performance of the first sequence of depth scanning operations, a second sequence of depth scanning operations. For example, in the second sequence of depth scanning operations, the second depth scanning device may detect (e.g., from a second vantage point of the second location) additional depth data for the surfaces included within the scan zone by rotating, for each depth scanning operation in the second sequence of depth scanning operations, the second scan head to sweep a second scan field across the second angle (e.g., the second 90° including the scan zone in the example given above).

As with the first depth scanning device, the second depth scanning device may abstain from detecting, during the performance of the second sequence of depth scanning operations, depth data for surfaces outside the second angle. The second depth scanning device may perform this abstaining in the same or similar ways as described above for the first depth scanning device.

Along with the first and second depth scanning devices described above, the depth scanning system may further include one or more additional depth scanning devices (e.g., depth scanning devices that are similarly disposed around a perimeter of the scan zone such as at other corners of the exemplary rectangular scan zone and that are configured to operate concurrently with one another and/or with the first and second depth scanning devices), as well as other hardware and/or software components as may serve a particular implementation. For example, in certain implementations, the depth scanning system may include a depth map computing device (e.g., one or more server computers, etc.) configured to receive the depth data for the surfaces included within the scan zone detected by the first depth scanning device from the first vantage point, to receive the additional depth data for the surfaces included within the scan zone detected by the second depth scanning device from the second vantage point, to correlate the depth data and the additional depth data based on synchronization signals, such as timecodes included as metadata with the depth data and the additional depth data, and to generate a depth map of the surfaces included within the scan zone based on the correlated depth data and additional depth data received.

Additionally, as will be described in more detail below, the depth scanning system may be integrated with and/or otherwise configured to interoperate with other systems and/or devices configured to detect and process other types of data for the surfaces included in the scan zone. For example, a color capture system including a plurality of color capture devices (e.g., video cameras, etc.) may be configured to capture texture data (e.g., two-dimensional color video data) associated with the surfaces of the objects in the scan zone from the same or similar vantage points that the depth data is captured by the depth scanning system.

As will be further described and made apparent below, systems and methods for detecting depth data and generating depth maps using disclosed techniques for efficient inward-looking depth scanning of a scan zone may provide various benefits and advantages. As one example, systems and methods described herein may allow inward-looking depth scanning systems to detect depth data and generate depth maps (e.g., four-dimensional depth maps representing surfaces with respect to three spatial dimensions and a fourth temporal dimension) with data captured from multiple vantage points simultaneously or within a shorter period of time than may be possible without use of the disclosed systems and methods.

Additionally, as will be described below, systems and methods described herein may help maximize usage of depth scanning resources to efficiently detect relevant, detailed depth data in a relatively short period of time. As such, disclosed systems and methods may facilitate the generation of high quality (e.g., highly accurate, high resolution, etc.) depth data that may benefit various applications in which the depth data is employed. For instance, high quality depth data detected using systems and methods for efficient inward-looking depth scanning of a scan zone described herein may allow immersive virtual reality media content to be generated and distributed to users, benefiting both the users and the virtual reality providers providing the virtual reality media content. Using a system or method for inward-looking, phase-matched depth scanning allows for higher resolution depth capturing, more efficient use of resources, and an improved time on target for the scanning system.

Another benefit that may arise specifically in an application involving virtual reality media content representative of a real-world scene is that a user may become immersed in the real-world scene to an extent that may not be possible for people presented with the real-world scene by way of conventional media (e.g., television) or conventional virtual reality media. Specifically, four-dimensional modeling of a scan zone included within the real-world scene using depth data detected in accordance with disclosed systems and methods may allow the user to dynamically and arbitrarily experience the scan zone of the real-world scene from a dynamically selectable virtual viewpoint that may be arbitrarily moved around within a virtual reality world representative of the real-world scene (i.e., as opposed to being statically tied to one or more virtual viewpoints within the virtual reality world that are preselected by a creator or provider of the virtual reality media content, as may be the case with conventional virtual reality media (e.g., 360-degree video)). Accordingly, the user may experience the real-world scene from perspectives that may not even be available to people physically present at the real-world scene. For example, a virtual reality user may be able to experience a live basketball game as if running up and down the court with the players, or may experience a live concert as if standing on stage next to the performers.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary depth scanning system 100 ("system 100") for inward-looking depth scanning of a scan zone (e.g., a scan zone of a real-world scene). As shown, system 100 may include, without limitation, a depth scanning facility 102, a management facility 104, and a storage facility 106 selectively and communicatively coupled to one another. It will be recognized that although facilities 102 through 106 are shown to be separate facilities in FIG. 1, facilities 102 through 106 may be combined into fewer facilities, such as into a single facility, or divided into more facilities as may serve a particular implementation. Each of facilities 102 through 106 may be distributed between multiple devices and/or multiple locations as may serve a particular implementation. Additionally, one or more of facilities 102 through 106 may be omitted from system 100 in certain implementations, while additional facilities may be included within system 100 in the same or other implementations. Each of facilities 102 through 106 will now be described in more detail.

Depth scanning facility 102 may include any suitable hardware or combination of hardware and software (e.g., depth scanning devices, computing devices, software running on the computing devices, etc.) that may be configured to be disposed at different locations with respect to a scan zone of a real-world scene and that may be configured to detect depth data for surfaces included within the scan zone from different vantage points. For example, depth scanning facility 102 may include a first depth scanning device and a second depth scanning device (e.g., implemented by Light Detection and Ranging ("LIDAR") devices configured to detect depth data based on a time of flight depth detection technique or by other suitable depth scanning devices such as pulsed Radio Detection and Ranging ("RADAR") devices or the like). The first and second depth scanning device may be configured to be disposed, respectively, on or near a boundary of the scan zone at a first location where a first pair of segments of the boundary meet to form a first angle that includes the scan zone (e.g., at a first corner of the scan zone), and on the boundary of the scan zone at a second location where a second pair of segments of the boundary meet to form a second angle that includes the scan zone (e.g., at a second corner of the scan zone).

The depth scanning devices included within depth scanning facility 102 may further be configured to detect depth data for surfaces (e.g., visible surfaces of objects) included within the scan zone from the respective vantage points of the depth scanning devices. For example, the first depth scanning device may be configured to perform a first sequence of depth scanning operations in which the first depth scanning device detects (e.g., from a first vantage point of the first location) depth data for surfaces included within the scan zone by rotating, for each depth scanning operation in the first sequence of depth scanning operations, the first scan head to sweep a first scan field across the first angle. The first depth scanning device may further be configured to abstain from detecting depth data for surfaces outside the first angle during the performance of the first sequence of depth scanning operations.

Similarly, the second depth scanning device included within depth scanning facility 102 may be configured to perform a second sequence of depth scanning operations where the second depth scanning device detects (e.g., from a second vantage point of the second location) additional depth data for the surfaces included within the scan zone by rotating, for each depth scanning operation in the second sequence of depth scanning operations, the second scan head to sweep a second scan field across the second angle. Similar to the first depth scanning device, the second depth scanning device may further be configured to abstain from detecting depth data for surfaces outside the second angle during the performance of the second sequence of depth scanning operations.

In some examples, additional depth scanning devices may be disposed at other locations with respect to the scan zone (e.g., at other corners or along edges of the scan zone) and one or more of the depth scanning devices may perform similar sequences of depth scanning operations concurrently with one another to detect depth data of surfaces within the scan zone from other vantage points. As used herein, sequences of depth scanning operations may be performed "concurrently" when there is at least some overlap between one or more depth scanning operations performed as part of one sequence and one or more depth scanning operations performed as part of another sequence. For example, the first and second depth scanning devices may respectively perform the first and second sequences of depth scanning operations concurrently by performing the sequences during the same period of time. In some examples, as will be described below, sequences of depth scanning operations may not only be performed concurrently, but may further be synchronized in certain ways. For example, each depth scanning operation performed by one depth scanning device may be phase matched with a corresponding depth scanning operation performed by another depth scanning device.

As used herein, "depth data" may include any spatial location data, positional coordinate data, or other data representative of a position of one or more surfaces of one or more objects in three-dimensional ("3D") space. For example, as will be described and illustrated below, depth data for surfaces of objects included in a real-world scene (e.g., within a scan zone of a real-world scene) may describe spatial locations of the surfaces with respect to a 3D coordinate system (e.g., a 3D local coordinate system associated with a particular depth scanning device, a 3D global coordinate system referenced by multiple depth scanning devices, etc.). In certain examples, depth data may also be detected and tracked with respect to a fourth, temporal dimension such that a four-dimensional ("4D") depth map may be generated representative of the spatial positions of surfaces and how the surfaces move and change over time both in absolute space and in relation to one another. Depth data may be captured or otherwise detected in various ways and/or by various techniques including by systems and methods described herein. As will be described below, in certain examples, depth data may be combined and/or synchronized with video data (e.g., two-dimensional ("2D") video data) to generate virtual reality media content such as, for example, virtual reality content associated with a virtual reality world representative of a real-world scene that includes the objects. Examples of depth data, techniques for capturing depth data, and uses for depth data are described herein.

As used herein, a "real-world scene" may refer to any real-world scenery, real-world location, real-world event (e.g., live event, etc.), or other subject existing in the real world (e.g., as opposed to existing only in a virtual world) as may serve a particular implementation. As such, a "scan zone" within a real-world scene may refer to a particular area within the real-world scene around which depth scanning devices included within a depth scanning system such as system 100 are disposed and for which a multiple-perspective depth map may be generated based on inward-looking depth scanning of the scan zone. For example, a real-world scene may include or be associated with an indoor or outdoor real-world location, a real-world event (e.g., a sporting event, a concert, a theatrical presentation, a large-scale celebration, etc.), a setting for a fictionalized scene (e.g., a set of a live-action virtual reality television show or movie) and/or any other scene at any other indoor or outdoor real-world location as may serve a particular implementation. The scan zone of any of these real-world scenes may therefore refer to any particular area within the real-world scene for which inward-looking depth scanning may be performed. For example, if the real-world scene is associated with a basketball game event taking place at a basketball stadium, the scan zone of the real-world scene may include the basketball court.

Accordingly, as used herein, "surfaces included within a scan zone" may refer to any detectable (e.g., visible) surface of an object that is fully or partially located within a scan zone and/or that is detectable from a location within the scan zone. Such an "object" may refer to anything, whether living or inanimate, that exists in the real world and is associated with the scan zone (e.g., is located within or around the scan zone, is detectable from a location within the scan zone, etc.). For example, "objects," as used herein, may refer to discrete objects that are traditionally considered objects as well as, more broadly, other animate or inanimate things and surfaces, such as people and other living things, the sun, liquids, gases, walls, ceilings, floors, and the like. To illustrate, if a scan zone is associated with a real-world event such as an indoor basketball game, objects for which depth data may be detected may include the basketball being used for the game, the basketball court, the scoreboards, the basketball standards (i.e., the backboards, rims, nets, etc.), the players and referees participating in the game, the fans, the arena, and/or other objects present at and/or associated with the basketball game.

Management facility 104 may include one or more physical computing devices (e.g., the same hardware and/or software components included within depth scanning facility 102 and/or components separate from those of content presentation facility 102) that perform various operations associated with managing (e.g., synchronizing, directing, etc.) depth scanning devices and/or other components of depth scanning facility 102, as well as with managing (e.g., processing, facilitating storing and/or loading of, etc.) data detected by depth scanning facility 102. For example, management facility 104 may direct the first and second depth scanning devices, as well as other depth scanning devices included within depth scanning facility 102, to perform respective sequences of depth scanning operations concurrently with one another and, in certain examples, in phase with one other (e.g., in synchronization).

Additionally, management facility 104 may perform various other operations to receive, process, and provide the depth data detected by depth scanning facility 102 to facilitate use of the depth data by other systems or other facilities of system 100 not explicitly shown. For example, management facility 104 (e.g., a depth map computing device included within management facility 104) may receive the depth data for the surfaces detected by the first depth scanning device from the first vantage point and the additional depth data for the surfaces detected by the second depth scanning device from the second vantage point. Management facility 104 may then correlate the depth data and the additional depth data based on synchronization signals (e.g., timecodes or the like) included as metadata with the depth data and the additional depth data (e.g., by associating depth data detected by one depth scanning device at a particular time with additional depth data detected by other depth scanning devices at the same particular time, based on a timecode and/or other data incorporated in a synchronization signal). Management facility 104 may then generate, based on the correlated depth data and additional depth data, a depth map of the surfaces included within the scan zone. Management facility 104 may also provide the depth map for use by another system or facility (e.g., a virtual reality provider system) and/or perform any other operations described herein or as may serve a particular implementation.

Storage facility 106 may maintain depth data 108 and/or any other data received, generated, managed, maintained, used, and/or transmitted by facilities 102 and 104. Depth data 108 may include depth data for surfaces of objects included in a scan zone of a real-world scene (e.g., detected by depth scanning facility 102) and/or depth maps based on the depth data (e.g., generated by management facility 104). Examples of depth data will be provided and illustrated below. Storage facility 106 may further include any other data as may be used by facilities 102 and 104 to perform efficient inward-looking depth scanning of a scan zone as may serve a particular implementation (e.g., software instructions, etc.).

Figure 2:
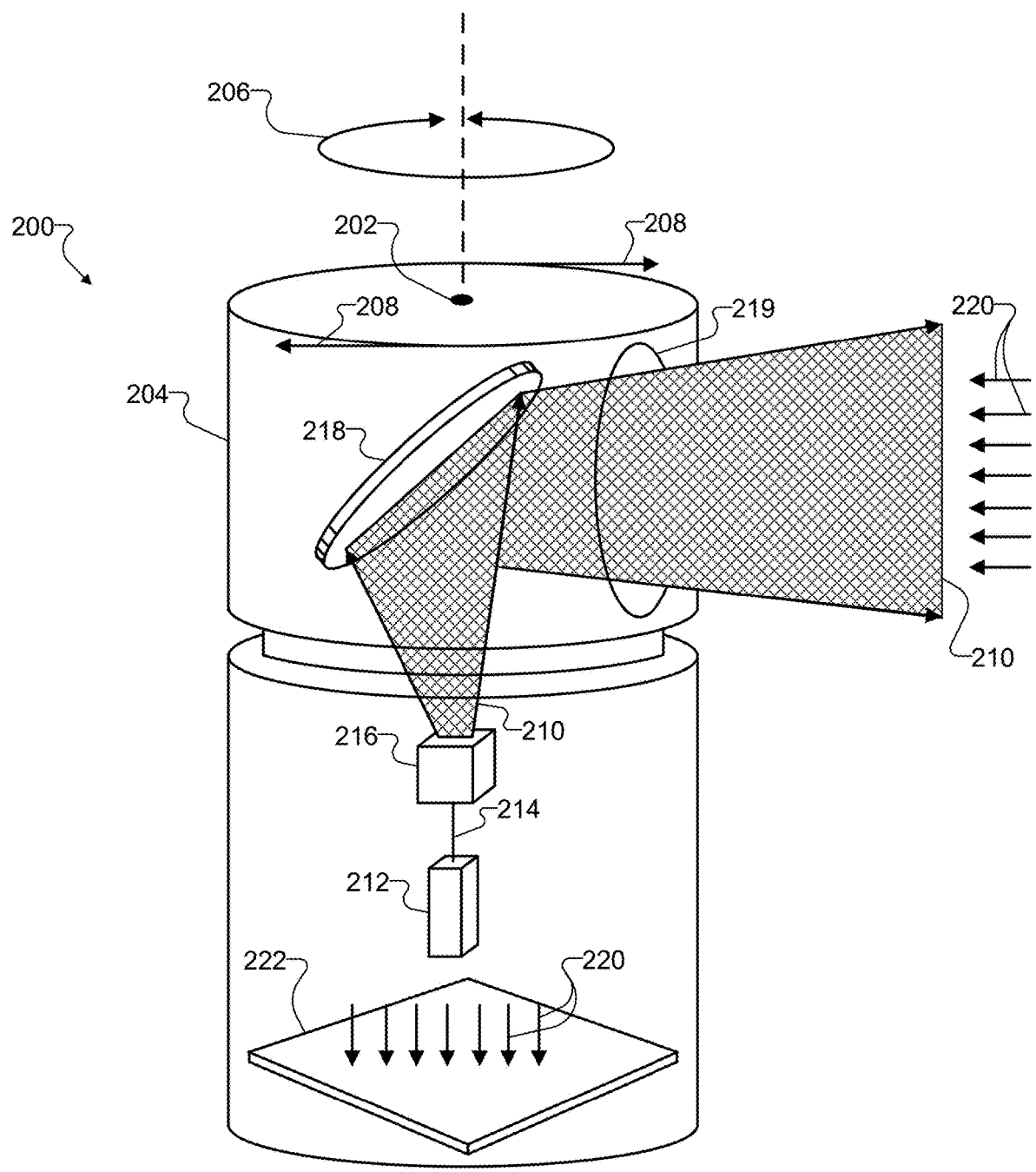
FIG. 2 illustrates an exemplary depth scanning device configured to detect depth data for surfaces included in a real-world scene according to principles described herein.

As mentioned above, system 100 may include a plurality of depth scanning devices configured to be disposed at different locations with respect to a real-world scene (e.g., on or near a boundary of a scan zone within the real-world scene) and configured to perform sequences of depth scanning operations in which depth data is detected by sweeping a scan field over a particular angle of the real-world scene (e.g., an angle that includes the scan zone). To illustrate, FIG. 2 shows an exemplary depth scanning device 200 configured to detect depth data for surfaces included in a real-world scene. Various components and aspects of depth scanning device 200 will now be described.

Depth scanning device 200 may be configured to be disposed at a particular location with respect to a real-world scene (not explicitly shown in FIG. 2), such as on or near a boundary of a scan zone. The location at which depth scanning device 200 is disposed may be associated with a vantage point 202 from which depth scanning device 200 may detect depth data for surfaces included within the real-world scene (e.g., within the scan zone). For example, as illustrated, depth scanning device 200 may, from vantage point 202, rotate a scan head 204 over an angle 206. As shown, for instance, scan head 204 may rotate in a particular rotational direction 208 (e.g., a clockwise motion as shown or a counterclockwise motion in other examples) so as to sweep a scan field 210 across angle 206 (i.e., to progressively sweep across surfaces included within angle 206). While vantage point 202 is illustrated as a point on the top of depth scanning device 200 (i.e., a point coincident with an axis around which scan head 204 rotates), it will be understood that vantage point 202 (as well as other vantage points described herein and illustrated in the figures) may represent a more abstract concept (e.g., a perspective, a viewpoint, etc.) associated with a location at which depth scanning device 200 is disposed, rather than as a precise point in space.

It is noted that certain other depth scanning devices described herein will use a similar numbering scheme for like components and aspects of the depth scanning devices mentioned above to denote the similarity in form and/or function of these components and aspects to the form and/or function of the components and aspects described in detail in connection with depth scanning device 200. Specifically, certain other depth scanning devices included herein will be numbered in accordance with a respective figure number and a "00" suffix (e.g., depth scanning device "300" in FIG. 3), other vantage points will include a "02" suffix, other scan heads will include a "04" suffix, other angles will include a "06" suffix, other rotational directions (e.g., clockwise or counterclockwise motions) will include a "08" suffix, and other scan fields will include a "10" suffix.

As shown, depth scanning device 200 also includes and/or illustrates other components and aspects that may be associated with other depth scanning devices described herein, but that will not be explicitly shown in connection with certain other depth scanning devices. For instance, depth scanning device 200 includes a light source 212, a light beam 214, a beam spreader 216, a mirror 218, and an optic center 219 (e.g., including a lens) for generating and emitting scan field 210 with a suitable extent (e.g., a vertical extent such as 20°-30° or another suitable angle allowing scan field 210 to capture the desired surfaces included within the scan zone). As light from scan field 210 reflects from surfaces included in the scan zone, FIG. 2 further illustrates that reflected light 220 may return to depth scanning device 200 to be received and detected by a light detector 222.

It will be understood that various other suitable components may be present in implementations of depth scanning device 200 and/or other depth scanning devices described herein, but may not be explicitly illustrated in FIG. 2. For example, processing resources (e.g., a processor, a memory, a communication interface with inputs and outputs, etc.) may be included within depth scanning device 200 to facilitate depth scanning device 200 in performing scanning operations with particular timing constraints (e.g., in synchronization with other depth scanning devices included with depth scanning device 200 within a depth scanning system) and/or to generate and output the depth data. For example, in certain implementations, depth scanning device 200 may include a synchronization subsystem (not explicitly shown) with an emitter for projecting a beam onto scan head 204 as scan head 204 rotates and a sensor for detecting one or more markers (e.g., reflective markers) disposed on scan head 204 as the one or more markers pass under the beam projected by the emitter. Depth scanning device 200 may further include processing resources configured to control the rotation of scan head 204 based on feedback from the sensor. For instance, the feedback may facilitate the synchronization subsystem in determining when each scan operation (e.g., each new rotation of scan head 204) begins, how long each scan operation takes, and so forth. Thus, using the feedback, the synchronization subsystem may receive a synchronization signal (e.g., in the form of periodic pulses from a master clock or the like) and ensure that rotations of scan head 204 remain in synchronization with the master clock (i.e., thereby remaining in synchronization with other depth scanning devices in the depth scanning system).

In operation, depth scanning device 200 may, in some examples, operate by generating and emitting scan field 210 and using a time-of-flight depth detection technique to determine depth data for surfaces based on how long it takes for light included within scan field 210 to reflect back from the surfaces to be received at light detector 222. As such, in certain examples, depth scanning device 200 may be implemented as a LIDAR device configured to detect the depth data based on a time of flight of a laser pulse emitted by the LIDAR device and that reflects from the surfaces included within the scan zone to be detected by the LIDAR device from vantage point 202. In other examples, depth scanning device 200 may be implemented using RADAR or another suitable technology using a suitable scan-based time-of-flight detection technique.

In examples where depth scanning device 200 is implemented as a LIDAR device, light source 212 may be a laser (e.g., a visible light laser, an infrared laser, etc.) or another suitable light source configured to generate a pulse of electromagnetic radiation (e.g., within a series of pulses) configured to reflect back from various points on surfaces of objects based on the depth (i.e., the distance from depth scanning device 200) of the points on the surfaces. Accordingly, light beam 214 may be a laser beam (e.g., a short laser beam pulse) or another suitable pulse of light generated by light source 212. Beam spreader 216 may be used, along with optic center 219, to shape scan field 210 such that multiple points along a surface may be detected at once. For example, beam spreader 216 may spread a laser beam (which may be a small point) into a linear scan field such as scan field 210 that can sweep over objects in one direction (e.g., horizontally, vertically, etc.) to detect depth data for all the points on the surfaces of the objects visible from vantage point 202 and that lie within an angle (e.g., a scan height, a scan width, etc.) covered by scan field 210.

In order to sweep (e.g., scan, progressively aim, etc.) scan field 210 over surfaces in a real-world scene, scan head 204 may include mirror 218, which may be configured at an angle to reflect scan field 210 out of scan head 204 (e.g., through optic center 219, which may be configured to treat, spread, or otherwise process the light of scan field 210) as scan head 204 rotates in rotational direction 208. As scan head 204 rotates, this sweeps scan field 210 across angle 206 to progressively scan the surfaces included within angle 206 during a depth scanning operation (e.g., a depth scanning operation included within a sequence of depth scanning operations). In some examples, as shown, angle 206 may be 360°, such that scan head 204 spins in complete rotations to capture depth data surrounding depth scanning device 200 in all directions along a plane (e.g., to the left, right, front, and back of depth scanning device 200). In other examples, as will be described and illustrated below, angle 206 may be less than 360°. For example, angle 206 may be a 90° angle or another angle formed where two segments of a scan zone boundary meet (e.g., at a corner of the scan zone such that the angle includes the scan zone). In these examples, scan head 204 may thus not spin or complete entire rotations, but rather may detect depth data within angle 206 while abstaining from detecting depth data for surfaces outside angle 206.

Because reflection times are limited by the speed of light, a frequency at which depth scanning of a scan zone is performed may be limited. Specifically, as scan head 204 rotates to scan each degree of the scan zone included in angle 206, light included in scan field 210 must have time to travel from depth scanning device 200 to reflect off the surfaces in the scan zone and to return to depth scanning device 200 as reflected light 220 to be detected at light detector 222 before scan head 204 has significantly rotated so as to block reflected light 220. Accordingly, while it may be possible for depth scanning device 200 to complete several complete rotations per second (e.g., ten to twenty rotations per second), it may not be possible for depth scanning device 200 to scan the real-world scene with an arbitrarily high frequency due to physical limits such as the speed of light and the size of a particular real-world scene (e.g., the depths of the surfaces in the real-world scene with respect to vantage point 202). Fortunately, as will be described below, systems and methods described herein may allow depth scanning devices to perform as efficiently as possible to provide high levels of performance in spite of physical limitations that may constrain the depth scanning devices.

Figure 3:
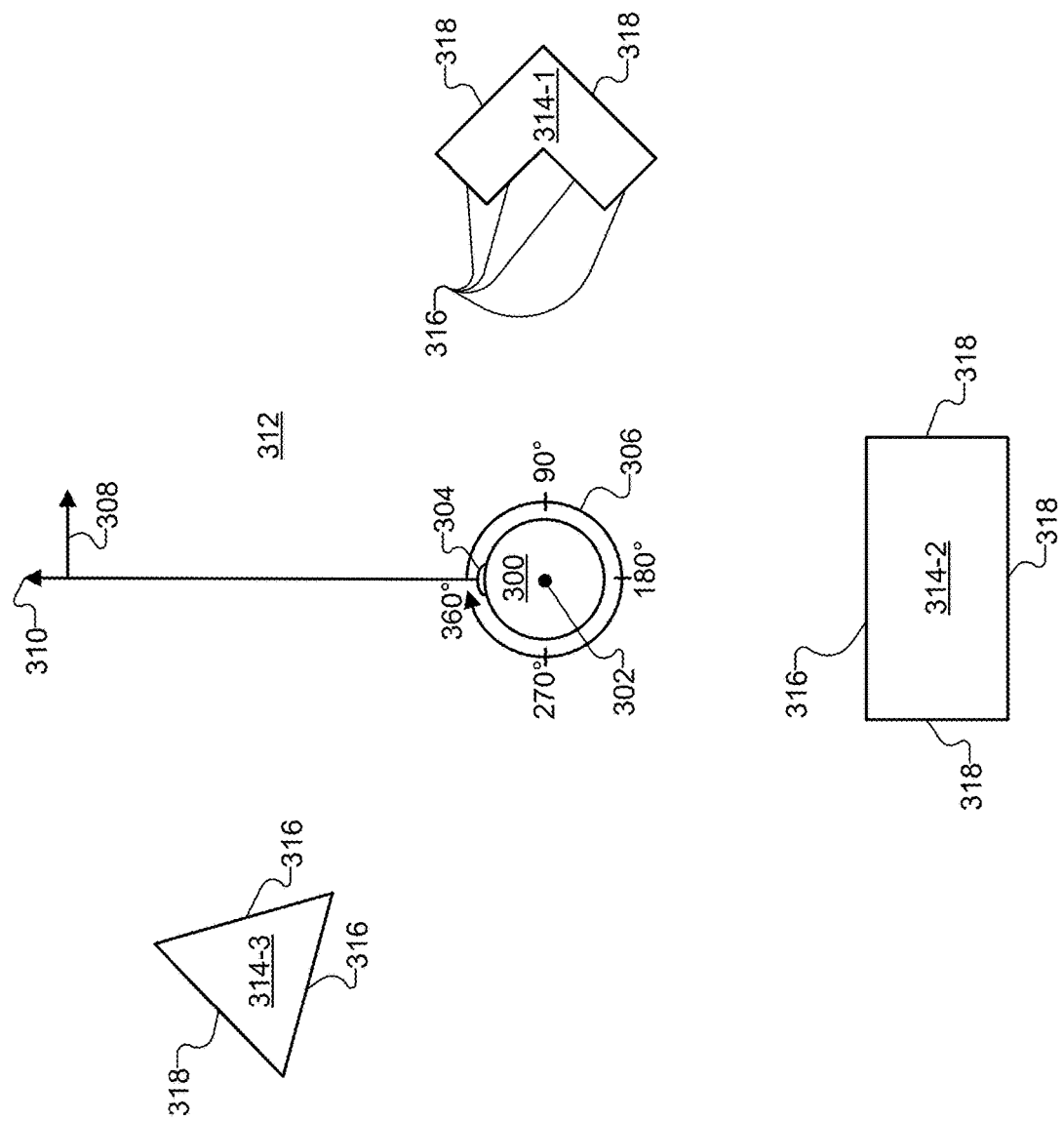
FIG. 3 illustrates a top view of an exemplary configuration in which an exemplary depth scanning device performs outward-looking depth scanning of an exemplary real-world scene to detect depth data for surfaces included in the real-world scene according to principles described herein.

FIG. 3 illustrates a top view of an exemplary configuration in which an exemplary depth scanning device 300 performs outward-looking depth scanning of an exemplary real-world scene to detect depth data for surfaces included in the real-world scene. Depth scanning device 300 may be similar or the same as depth scanning device 200 and, as such, may include various similar components and aspects as depth scanning device 200 that are numbered in like manner as depth scanning device 200, as described above. Specifically, as shown in FIG. 3, depth scanning device 300 may be located at a location associated with a vantage point 302, and may have a scan head 304 that includes an optic center (e.g., analogous to optic center 219 illustrated in FIG. 2) indicated by a small bump in FIG. 3 and that rotates around an angle 306 in a rotational direction that, in this example, is illustrated by a clockwise motion 308. In this way, depth scanning device 300 may sweep a scan field 310 across angle 306 to detect depth data for surfaces included in a real-world scene 312. The operation of depth scanning device 300 may be similar or identical to the operation of depth scanning device 200, described above.

As shown, angle 306 over which depth scanning device 300 may perform depth scanning operations may be an angle of 360°. As such, depth scanning device 300 may detect depth data of various surfaces of various objects 314 (e.g., objects 314-1 through 314-3) included within real-world scene 312 and that surround vantage point 302 on various sides. For example, various surfaces 316 of objects 314 may all be detectable by depth scanning device 300 from vantage point 302 as scan head 304 rotates all the way around angle 306. In this sense, depth scanning device 300, as arranged in the configuration of FIG. 3, may be said to perform "outward-looking" depth scanning because depth data is detected in all directions looking outward from vantage point 302.

Because objects 314 may each have one or more additional surfaces 318 that are not detectable from vantage point 302, however, it will be understood that depth scanning device 300 may not be able to detect enough depth data by itself and in the outward looking depth scanning configuration to fully model objects 314. For example, while a single perspective depth map may be generated that represents surfaces 316, additional data may be needed to represent surfaces 318 (e.g., and/or to represent surfaces 316 in more detail) within the depth map (e.g., within a multiple-perspective depth map).

To further illustrate the outward looking depth scanning performed by depth scanning device 300, FIG. 4 shows a perspective view of a portion of the configuration illustrated in FIG. 3. Specifically, as shown by the segment of angle 306 labeled beneath the perspective view of real-world scene 312 including object 314-1, FIG. 4 illustrates a portion of real-world scene 312 detected by depth scanning device 300 as scan field 310 sweeps across angle 306 from approximately 45° to approximately 135°. As shown, real-world scene 312 is scanned in clockwise motion 308, which equates to a left to right movement from the perspective shown in FIG. 4, since clockwise motion 308 is clockwise with respect to the top view of FIG. 3. (It will be understood that a clockwise motion with respect to a view from beneath depth scanning device 300 in FIG. 3 would equate to a right to left movement from the perspective shown in FIG. 4.)

As shown, scan field 310 may be represented as a thin line that covers a certain vertical extent 420 (e.g., a 20°-30° vertical extent in certain implementations). In this example, vertical extent 420 is tall enough for the entirety of object 314-1 (i.e., all of detectable surfaces 316 of object 314-1) to be scanned as scan field 310 sweeps across object 314-1 in accordance with clockwise motion 308. Accordingly, as shown, surfaces 316 of object 314-1 have all been scanned as scan field 310 sweeps across angle 306. It will be understood, however, that other surfaces of object 314-1 (e.g., surfaces 318 beneath and/or on the back side of object 314-1 that are not visible from the perspective of FIG. 4 or from vantage point 302) may not be detected by the outward-looking depth scan illustrated in FIGS. 3 and 4.

Also shown in FIG. 4 are approximate times at which different parts of real-world scene 312 (e.g., including object 314-1) are detected with respect to a scan time period of a particular depth scanning operation (e.g., a single sweep of scan field 310 across angle 306). Specifically, the scan time period may be represented by the Greek letter "τ" in FIG. 4 and the time at which a particular portion of angle 306 is detected may be represented by a "t" for "time." Accordingly, as shown, the portion of real-world scene 312 at 45° along angle 306 may be detected at approximately 12.5% of the way through a particular depth scanning operation (i.e., t=0.125 τ), the portion of real-world scene 312 at 90° along angle 306 may be detected at approximately 25.0% of the way through the particular depth scanning operation (i.e., t=0.250 τ), and the portion of real-world scene 312 at 135° along angle 306 may be detected at approximately 37.5% of the way through the particular depth scanning operation (i.e., t=0.375 τ). Thus, in an example where depth scanning device 300 has a frequency of 20 Hz (i.e., completes 20 depth scanning operations per second) such that the scan time period of depth scanning device 300 is 50 milliseconds ("ms"), depth scanning device 300 may scan object 314-1 at approximately 25% of the way through the depth scanning operation, or at approximately 12 or 13 ms after each particular depth scanning operation begins. Scan times will be represented in similar ways with respect to similar angles in other figures illustrated below.

FIGS. 3 and 4 have illustrated how a single depth scanning device (e.g., depth scanning device 300) may perform outward-looking depth scanning to detect depth data for surfaces in a real-world scene (i.e., surrounding the depth scanning device on all sides). In certain examples, however, it may be advantageous to perform inward-looking depth scanning on a particular area of a real-world scene using a plurality of depth scanning devices disposed, for example, around a perimeter of the particular area. Such an area of a real-world scene may be referred to herein as a scan zone, and a depth scanning system performing inward-looking depth scanning on the scan zone may include a plurality of depth scanning devices disposed on or near a boundary outlining or surrounding the scan zone.

FIG. 5A illustrates a variety of exemplary scan zones 500 (i.e., scan zones 500-1 through 500-4) for which inward-looking depth scanning may be performed. Each scan zone 500 may be defined by a boundary that forms a polygon having a plurality of sides meeting at a plurality of vertices. For example, as shown, scan zone 500-1 includes a boundary forming a triangle having three sides 502 (i.e., sides 502-1 through 502-3) that meet at three vertices 504 (i.e., vertices 504-1 through 504-3). Similarly, in other examples illustrated in FIG. 5A, scan zone 500-2 includes a boundary forming a hexagon having six sides 506 (i.e., sides 506-1 through 506-6) that meet at six vertices 508 (i.e., vertices 508-1 through 508-6), and scan zone 500-3 includes a boundary forming a square having four sides 510 (i.e., sides 510-1 through 510-4) that meet at four vertices 512 (i.e., vertices 512-1 through 512-4). Similar to scan zone 500-3, scan zone 500-4 includes a boundary forming a rectangle having four sides and four vertices. Specifically, the sides are each composed of one or more segments 514 (i.e., segments 514-1 through 514-6) while the vertices are coincident with certain locations 516 (i.e., locations 516-1 through 516-6) where segments 514 meet. Unlike the boundaries of scan zones 500-1 through 500-3, however, and for reasons that will be described in more detail below, some of the sides of the rectangle of scan zone 500-4 include more than one segment 514 and some of locations 516 (i.e., locations 516-3 and 516-6) do not correspond to a vertex (i.e., a corner) of the rectangle. While not explicitly shown in FIG. 5A, it will be understood that certain scan zones may not be implemented as polygons, but, rather may be circular, elliptical, include one or more curved sides rather than straight edges, and so forth as may serve a particular implementation.

As mentioned above, certain depth scanning devices (e.g., depth scanning devices included within a depth scanning system configured to perform inward-looking depth scanning) may be configured to be disposed on a boundary of a scan zone at a location where a pair of segments of the boundary meet to form an angle that includes the scan zone. Such locations may correspond to any suitable locations on the boundaries as may serve a particular implementation. For instance, certain segments of the boundary may correspond to sides of a polygon, such as sides 502, 506, or 510. In these examples, a depth scanning system may thus include a first depth scanning device configured to be disposed at a first location corresponding to a first vertex where a first side and a second side of a polygon meet, a second depth scanning device configured to be disposed at a second location corresponding to a second vertex where the second side and a third side of the polygon meet, and so forth. It should be understood that in addition to locating depth scanning devices at the vertices of a polygon, depth scanning devices may also be located adjacent a side of the polygon between two vertices as well.

Referring to scan zone 500-1, for example, the first depth scanning device may be disposed at a location corresponding to vertex 504-1 where sides 502-1 and 502-3 meet, the second depth scanning device may be disposed at a location corresponding to vertex 504-2 where sides 502-1 and 502-2 meet, and a third depth scanning device may be disposed at a location corresponding to vertex 504-3 where sides 502-2 and 502-3 meet. In like manner, depth scanning devices may be disposed at vertices 508 and/or vertices 512 where particular sides 506 and/or particular sides 510 meet, respectively, in scan zones 500-2 and 500-3.

Scan zone 500-4 illustrates an example where depth scanning devices included within a depth scanning system may be disposed at locations that do not necessarily correspond with vertices of a polygon formed by the boundary of scan zone 500-4. Specifically, while depth scanning devices may be disposed at the vertices of the rectangle (i.e., at locations 516-1, 516-2, 516-4, and 516-5), where various segments 514 meet at respective 90° angles, additional depth scanning devices may also be disposed at location 516-3, where segments 514-2 and 514-3 meet at a 180° angle, and at location 516-6, where segments 514-5 and 514-6 also meet at a 180° angle.

Regardless of whether a depth scanning device is disposed at a vertex of a scan zone (e.g., a corner of a polygon boundary where two sides meet to form an angle less than 180°) or at another location on a boundary of a scan zone (e.g., along a side of a polygon boundary where two segments meet to form a 180° angle, at a point on a curve of a non-polygon boundary, etc.), the angle associated with the location may "include" the scan zone in the sense that the entire scan zone may be located inside the angle.

To illustrate, FIGS. 5B-5C illustrate exemplary angles that include scan zone 500-3 and are associated with locations at which depth scanning devices may be disposed. Specifically, as shown in FIG. 5B, a first depth scanning device may be disposed at vertex 512-1, where sides 510-1 and 510-4 meet to form a 90° angle 518 that includes scan zone 500-3. Angle 518 is drawn using two bold arrows emanating from vertex 512-1 along each of sides 510-1 and 510-4 and continuing even beyond scan zone 500-3. As shown, these lines also form an angle 520 (i.e., a 270° angle) that does not include scan zone 500-3. Accordingly, when the first depth scanning device disposed at vertex 512-1 sweeps a scan field across angle 518, the first depth scanning device may detect depth data for surfaces included within scan zone 500-3, as well as other surfaces in a region 522 of the real-world scene beyond scan zone 500-3. However, as will be described in more detail below, the first depth scanning device may be configured to abstain from detecting depth data for surfaces outside of angle 518 (i.e., surfaces included in angle 520). As such, the first depth scanning device may abstain from detecting depth data for surfaces included within a region 524 of the real-world scene.

As shown in FIG. 5C, a second depth scanning device may be disposed at vertex 512-2, where sides 510-1 and 510-2 meet to form a 90° angle 526 that, like angle 518, also includes scan zone 500-3. As with angle 518, the bold arrows defining angle 526 also define a 270° angle 528 that does not include scan zone 500-3. Accordingly, when the second depth scanning device disposed at vertex 512-2 sweeps a scan field across angle 526, the depth scanning device may detect depth data for surfaces included within scan zone 500-3, as well as other surfaces in a region 530 of the real-world scene beyond scan zone 500-3. It is noted that region 530 may overlap somewhat with regions 522 and 524 illustrated in FIG. 5B. However, if depth scanning devices are only disposed at the vertices of scan zone 500-3, no portions of the real-world scene outside of scan zone 500-3 will be scanned by way of inward-looking depth scanning from all four depth scanning devices, even if certain regions (e.g., such as illustrated by regions 522 and 530) may be scanned by one or two depth scanning devices. Similar to the first depth scanning device described above, the second depth scanning device may also be configured to abstain from detecting depth data for surfaces outside of angle 526 (i.e., surfaces included in angle 528). As such, the depth scanning device may abstain from detecting depth data for surfaces included within a region 532 of the real-world scene.

In the configurations of FIGS. 5A-5C, as well as in various other configurations described herein, depth scanning devices may be shown or described as being disposed right on a boundary of a particular scan zone (i.e., one of scan zones 500 or another scan zone described herein). However, it will be understood that, in certain examples, depth scanning devices illustrated and/or described as being disposed "on a boundary" may actually be disposed on or near the boundary (e.g., just outside the boundary) such that the entire scan zone may be scanned with a scan field that has a vertical extent of 180° or less. Accordingly, it will be understood that, as used herein, a depth scanning device said to be disposed "on a boundary" of a scan zone may actually be disposed on or near the boundary (e.g., outside the boundary) such that the entire scan zone may be scanned. Additionally, it will be understood that while a particular scan zone represents an area scanned by a plurality of depth scanning devices in an inward-looking manner, the particular scan zone may not incorporate an entire area being scanned in the inward-looking manner and one or more of the depth scanning devices in the plurality of depth scanning device may scan areas other than areas incorporated in the particular scan zone.

Figure 6:
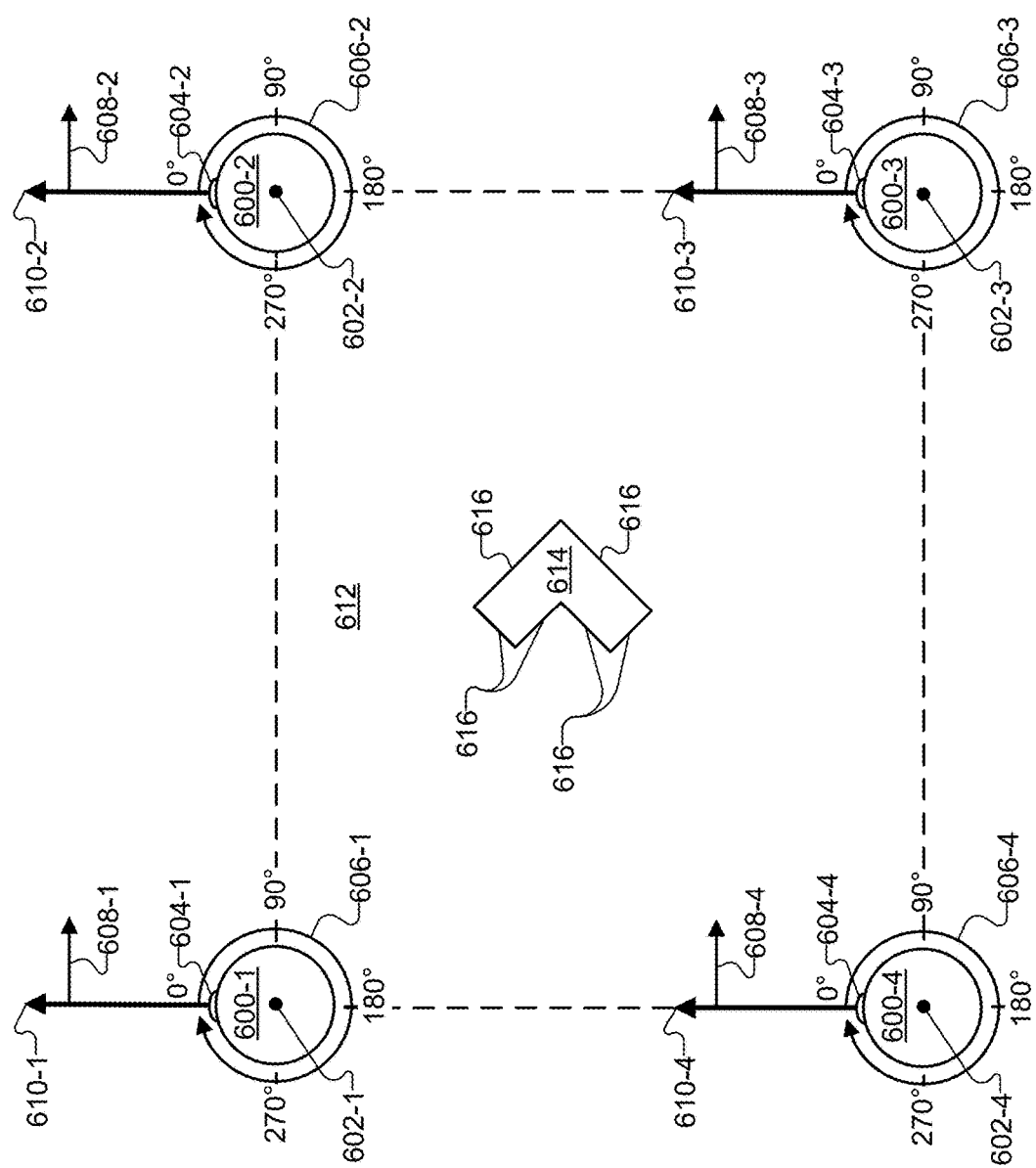
FIG. 6 illustrates a top view of an exemplary configuration in which an exemplary depth scanning system including a plurality of depth scanning devices performs inward-looking depth scanning of an exemplary scan zone to detect depth data for surfaces included in the scan zone according to principles described herein.

FIG. 6 illustrates a top view of an exemplary configuration in which an exemplary depth scanning system including a plurality of depth scanning devices performs inward-looking depth scanning of an exemplary scan zone to detect depth data for surfaces included in the scan zone. More particularly, FIG. 6 illustrates a depth scanning system (e.g., an implementation of system 100) and that includes a plurality of depth scanning devices 600 (e.g., depth scanning devices 600-1 through 600-4). As with depth scanning devices 200 and 300, depth scanning devices 600 are disposed at respective locations associated with respective vantage points 602 (i.e., vantage points 602-1 through 602-4 of depth scanning devices 600-1 through 600-4, respectively). As further illustrated in FIG. 6, depth scanning devices 600 also include respective scan heads 604 (i.e., scan heads 604-1 through 604-4 of depth scanning devices 600-1 through 600-4, respectively) that rotate around respective angles 606 (i.e., angles 606-1 through 606-4 of depth scanning devices 600-1 through 600-4, respectively) in respective rotational directions that, in this example, are illustrated by clockwise motions 608 (i.e., clockwise motions 608-1 through 608-4 of depth scanning devices 600-1 through 600-4, respectively). In this way, depth scanning devices 600 may sweep respective scan fields 610 (i.e., scan fields 610-1 through 610-4 of depth scanning devices 600-1 through 600-4, respectively) across respective angles 606 to detect depth data for surfaces included in a real-world scene, and, in particular, surfaces included in a scan zone 612 of the real-world scene.

The operation of depth scanning devices 600 may be similar or identical to the operation of depth scanning devices 200 and/or 300. However, whereas depth scanning device 300 was arranged in an outward-looking configuration, where only surfaces 316 of objects 314 were detectable from vantage point 302, depth scanning devices 600 in FIG. 6 are arranged in an inward-looking configuration such that depth data of an object 614 included within scan zone 612 may be detected from multiple perspectives so as to detect depth data for all surfaces 616 of object 614. Specifically, for example, while depth scanning devices 600-1 and/or 600-4 may, from vantage points 602-1 and 602-4, respectively, be able to detect depth data for surfaces 616 on the left side of object 614 (while being unable to detect depth data for the other surfaces 616), depth scanning devices 600-2 and 600-3 may, from vantage points 602-2 and 602-3, respectively, be able to detect depth data for the surfaces 616 on the right side of object 614 (while being unable to detect depth data for surfaces 616 on the left side that are detected by depth scanning devices 600-1 and 600-4).

Like depth scanning device 300, each of depth scanning devices 600 may sweep across full 360° angles 606 (i.e., spinning in full rotations) and, as such, may individually be described as being outward-looking depth scanning devices. However, because each of depth scanning devices 600 overlap to scan a common area of the real-world scene bounded by the locations at which depth scanning devices 600 are disposed, depth scanning devices 600 may collectively be said to perform inward-looking depth scanning within this common area of the real-world scene. As shown in FIG. 6, this common area may constitute or contain scan zone 612 and, as such, the implementation of system 100 that includes depth scanning devices 600 may perform inward-looking depth scanning of scan zone 612. Unlike with outward-looking depth scanning, objects and surfaces scanned using inward-looking depth scanning techniques may be modeled more completely (e.g., from multiple perspectives around scan zone 612). For example, rather than a single perspective depth map such as that described above in connection with surfaces 316 of real-world scene 312, the inward-looking depth scanning shown in FIG. 6 may detect sufficient data to generate a multiple-perspective depth map that captures all of surfaces 616, or at least more of surfaces 616 than are detectable from any single vantage point.

In some examples, a plurality of depth scanning devices may be synchronized together or otherwise configured to operate in phase with one another. As used herein, two rotations (e.g., such as respective rotations of depth scanning devices 600) may be "phase matched" or, in other words, may be said to scan, rotate, or otherwise operate "in phase" with one another if respective scan time periods of the two depth scanning devices are aligned so that one depth scanning device always performs a certain part of its depth scan at approximately a same moment that the other depth scanning device performs a certain part its depth scan. For example, as shown in FIG. 6, each of depth scanning devices 600 may operate in phase with one another if each of the depth scanning devices operates using a same scan time period. Specifically, for instance, if each of depth scanning devices 600 are aiming in an identical direction (i.e., toward the top of the page) at a particular moment, as shown, and if each of the depth scanning devices completes a full rotation in 50 ms, depth scanning devices 600 will remain synchronized and in phase with one another indefinitely as each rotates 20 times per second in a synchronous fashion.

In-phase depth scanning devices may not necessarily always be aiming in identical directions or rotating in identical directions. For example, depth scanning devices that aim in opposite directions at a same moment in time and that rotate in opposite directions (e.g., one rotating clockwise and the other rotating counterclockwise in reference to a common reference point such as a reference point above the depth scanning devices) may still rotate in phase with one another if both rotate at a same frequency (e.g., each rotation occurring over a same scan time period). Additionally, in certain examples, depth scanning devices 600 may be phase matched if one depth scanning device 600 operates at a frequency that is a multiple of a frequency of another depth scanning device 600. For example, if depth scanning device 600-1 completes two rotations for every rotation of depth scanning device 600-2, both depth scanning devices may still be said to be synchronized and operating in phase with one another in certain implementations.

Depth scanning devices such as depth scanning devices 600 may be synchronized in any suitable manner. For example, as described above with respect to depth scanning device 200 in FIG. 2, depth scanning devices 600 may each include a respective synchronization subsystem whereby a synchronization signal (e.g., a timed series of pulses generated by a master clock or the like) may be received by each depth scanning device 500 and used to maintain synchronization between the depth scanning devices 500. Additionally or alternatively, a synchronization signal including data representative of one or more timecodes (e.g., a timecode representative of the current time, one or more timecodes representative of scheduled times that scanning operations are to be initiated, etc.) may be provided to each depth scanning device 500 and used to facilitate synchronization between depth scanning devices 500, to mark depth data detected by depth scanning devices 500 in order to facilitate correlation of the depth data with depth data detected by other depth scanning devices, and/or for any other purpose as may serve a particular implementation.

Depth scanning devices 600 may be arranged and synchronized so as to perform inward-looking, phase-matched depth scanning of scan zone 612. However, even while the configuration of FIG. 6 may provide many benefits such as sufficient data to generate full models of multiple surfaces 616 of object 614 and/or other objects included within scan zone 612, the configuration of FIG. 6 may still leave room for improvement. For example, while scan zone 612 may be included within (i.e., bounded by) a polygon formed by the locations at which each depth scanning device 600 is disposed (e.g., the dotted rectangle shown around scan zone 612 in FIG. 6), because depth scanning devices 600 are each configured to rotate around respective 360° angles 606, approximately three fourths of each 360° depth scanning operation of each depth scanning device 600 may be unused or wasted in implementations where only depth data for surfaces included within scan zone 612 is being detected. In other words, each depth scanning device 600 may spend about three fourths of each depth scanning operation scanning across an angle that does not include scan zone 612, resulting in significant waste and inefficiency.

Figure 7:
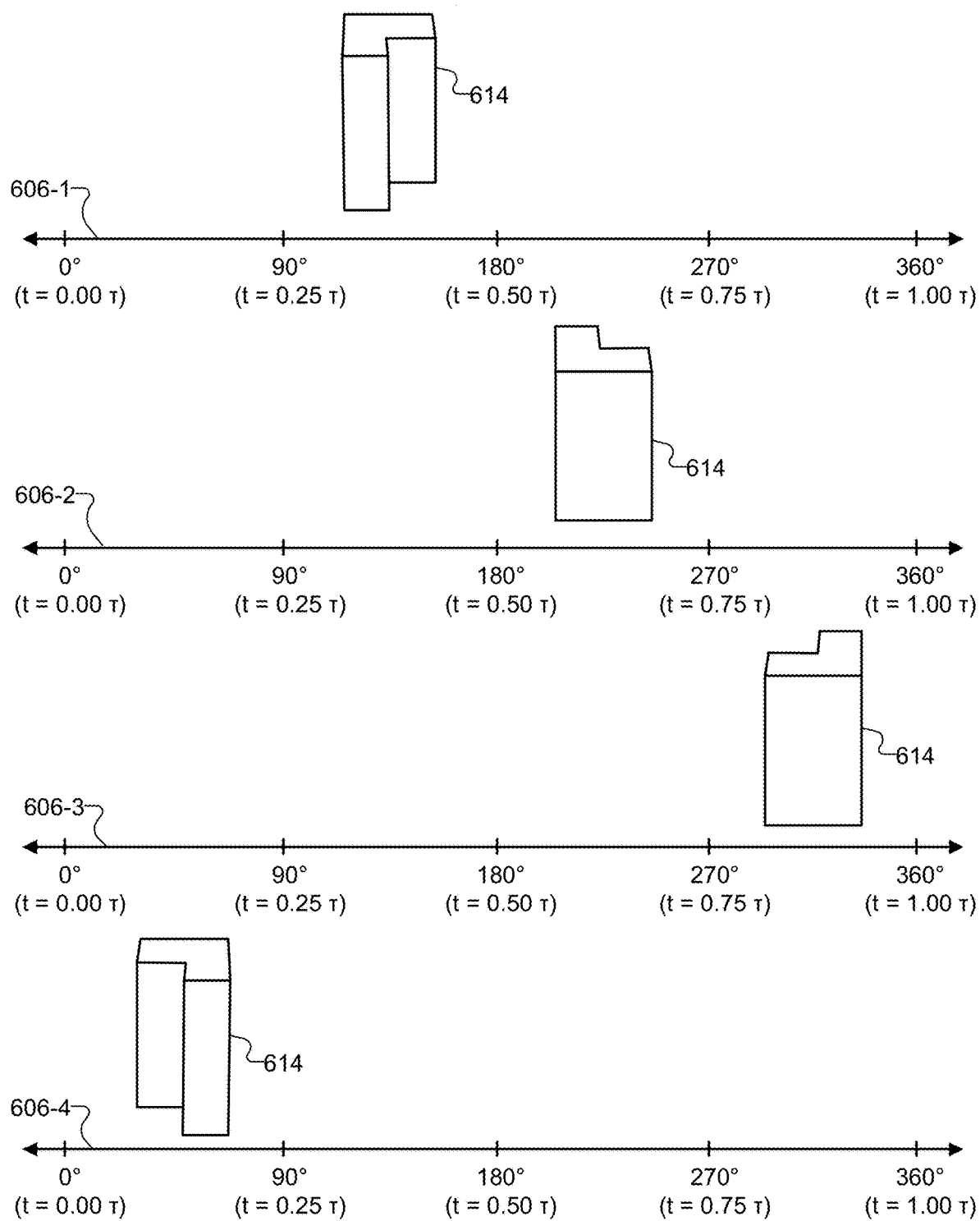
FIG. 7 illustrates exemplary depth scan details for concurrent depth scanning operations performed by each of the depth scanning devices illustrated in FIG. 6 according to principles described herein.

The effect of this inefficiency is illustrated in FIG. 7, which shows exemplary depth scan details for a single depth scanning operation (i.e., associated with one scan time period) for each of depth scanning devices 600. Similar to the perspective view illustrated in FIG. 4, FIG. 7 illustrates timing of when surfaces of an object (i.e., object 614) are scanned with respect to the scan time period of an entire scan cycle (i.e., represented by "τ"). Thus, as shown in FIG. 7, depth scanning device 600-1 scans around angle 606-1 (i.e., from 0° at the beginning of the depth scanning operation (t=0.00 τ) to 360° at the end of the depth scanning operation (t=1.00 τ)), including scanning surfaces of object 614 and other surfaces included within scan zone 612 at some point between 90° (e.g., t=0.25 τ) and 180° (e.g., t=0.50 τ). Meanwhile, depth scanning devices 600-2 through 600-4 also scan around respective angles 606 (i.e., angles 606-2 through 606-4, respectively), but, because of the respective locations at which they are disposed, scan surfaces of object 614 and other surfaces within scan zone 612 at different parts of their respective depth scanning operations (i.e., at different times during the scan time period). For example, as shown, depth scanning device 600-2 scans surfaces of object 614 and other surfaces within scan zone 612 at some point between 180° (e.g., t=0.50 τ) and 270° (e.g., t=0.75 τ), depth scanning device 600-3 scans surfaces of object 614 and other surfaces within scan zone 612 at some point between 270° (e.g., t=0.75 τ) and 360° (e.g., t=1.00 τ), and depth scanning device 600-4 scans surfaces of object 614 and other surfaces within scan zone 612 at some point between 0° (e.g., t=0.00 τ) and 90° (e.g., t=0.25 τ).

Additionally, FIG. 7 illustrates that three fourths of each depth scanning operation across angle 606 involves depth scanning in which no relevant surfaces (i.e., surfaces included within scan zone 612) are being detected. Specifically, as shown, no relevant surfaces are detected by depth scanning device 600-1 from 0° to 90° or from 180° to 360°, no relevant surfaces are detected by depth scanning device 600-2 from 0° to 180° or from 270° to 360°, no relevant surfaces are detected by depth scanning device 600-3 from 0° to 270°, and no relevant surfaces are detected by depth scanning device 600-4 from 90° to 360°. As such, the time associated with these portions of the depth scanning operation, as well as the depth data detected during these portions, may amount to time inefficiently spent and data purposelessly detected to the extent that system 100 is intended perform inward-looking depth scanning of scan zone 612.

Figure 8A:
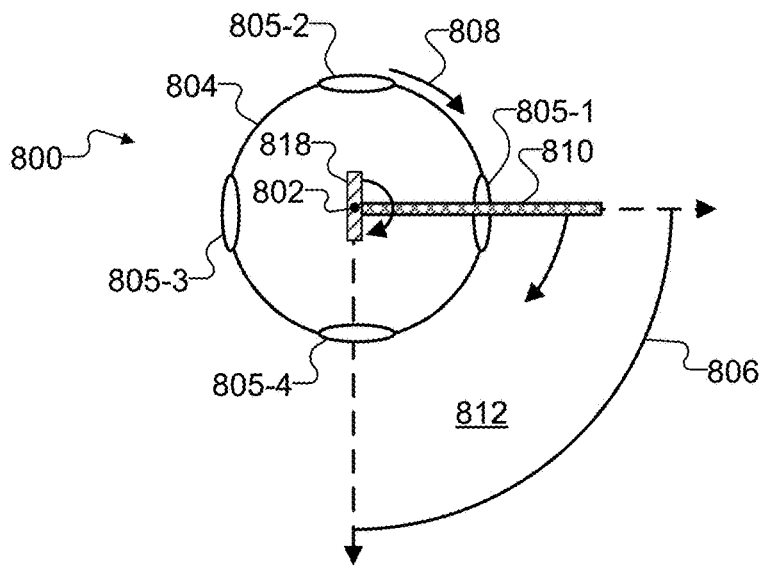
FIGS. 8A-8C illustrate an exemplary snap rotation technique whereby an exemplary depth scanning device abstains from detecting depth data for surfaces outside of a particular angle during a performance of a sequence of depth scanning operations according to principles described herein.
Figure 8B:
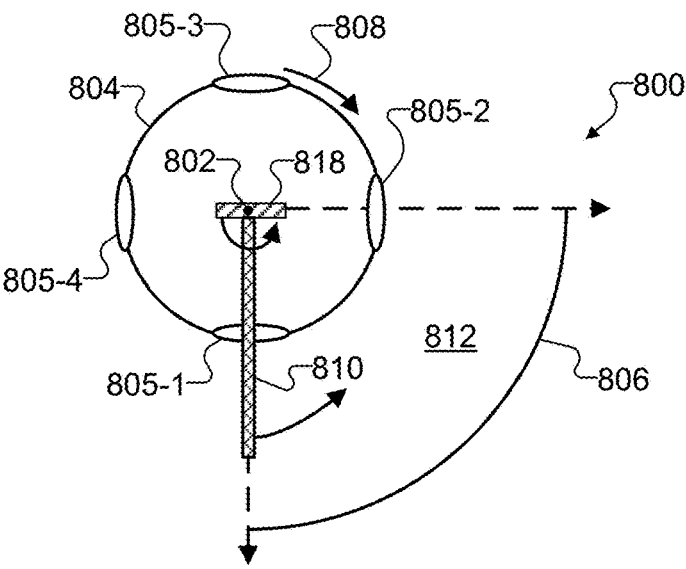
Figure 8C:
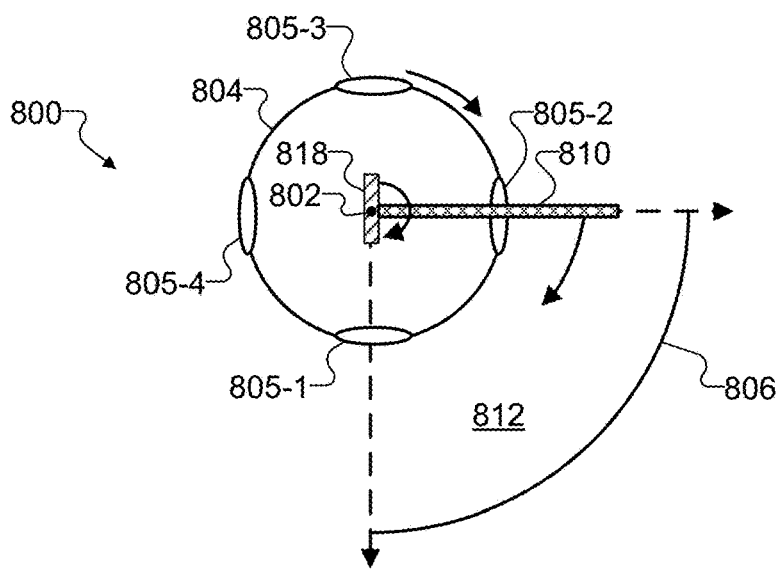
Figure 9A:
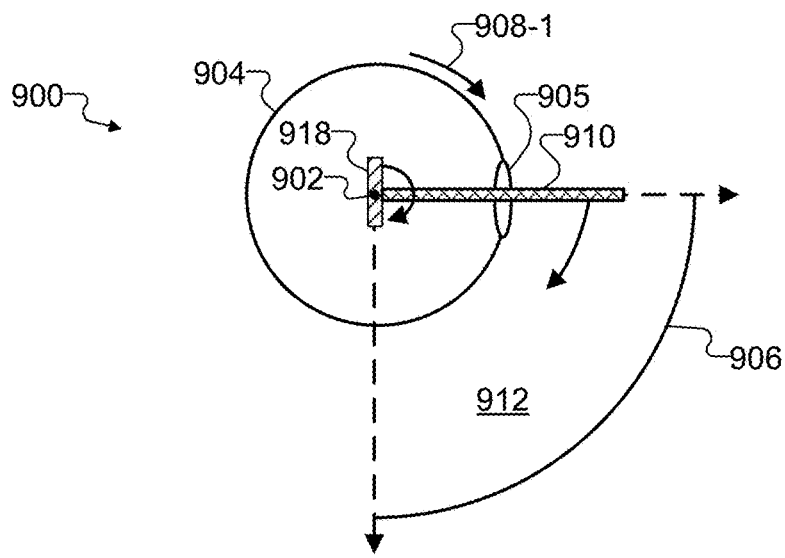
FIGS. 9A-9C illustrate an exemplary reverse rotation technique whereby an exemplary depth scanning device abstains from detecting depth data for surfaces outside of a particular angle during a performance of a sequence of depth scanning operations according to principles described herein.
Figure 9B:
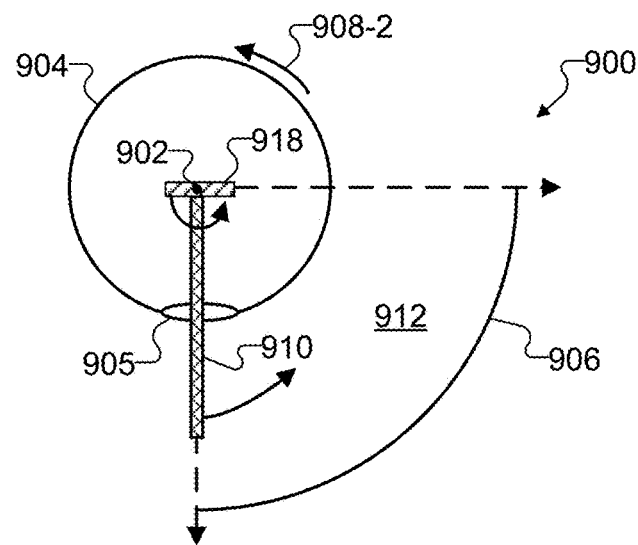
Figure 9C:
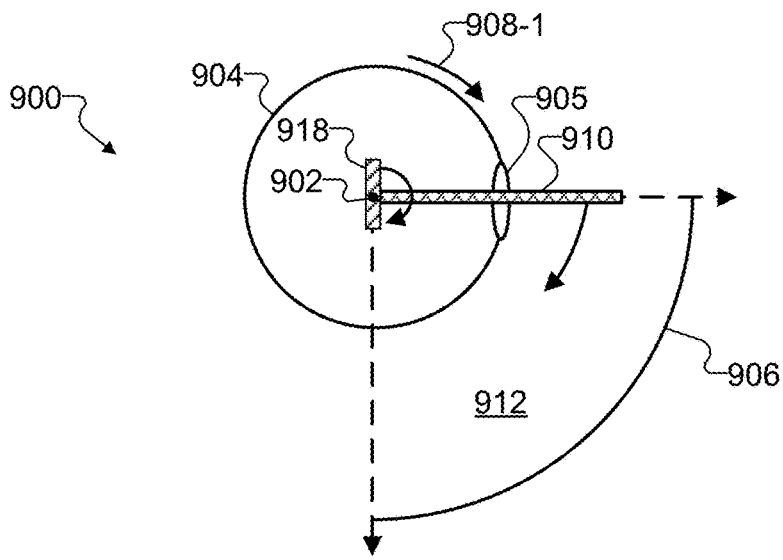

To remedy this inefficiency, FIGS. 8A-8C and 9A-9C illustrate different techniques by which a depth scanning device may detect depth data for surfaces included within an angle that includes relevant surfaces (i.e., an angle that includes a scan zone) while abstaining from detecting depth data for surfaces outside the angle that includes the relevant surfaces. Specifically, FIGS. 8A-8C illustrate an exemplary snap rotation technique and FIGS. 9A-9C illustrate an exemplary reverse rotation technique, both of which allow depth scanning devices to abstain from detecting depth data for surfaces outside of particular angles while performing a sequence of depth scanning operations.

As shown, each of FIGS. 8A-8C include a depth scanning device 800 with various components and aspects that are similarly numbered with other depth scanning devices described herein. Specifically, for example, depth scanning device 800 is associated with a vantage point 802 and a scan head 804. In contrast with other depth scanning devices described above, which have each included a single optic center disposed on a perimeter of their respective scan heads (e.g., optic center 219 and other optic centers not explicitly labeled), depth scanning device 800 is shown to include a plurality of optic centers 805 (i.e., optic centers 805-1 through 805-4) disposed around a perimeter of scan head 804.

Similar to other depth scanning devices described herein, depth scanning device 800 is configured to rotate scan head 804 across an angle 806 (e.g., an angle formed where a pair of segments of a boundary of a scan zone meet) in a rotational direction 808 (e.g., in a clockwise motion as shown or in a counterclockwise motion in other examples) in order to rotate a scan field 810 across angle 806 so as to detect depth data for surfaces included in a scan zone 812. However, while depth scanning devices described previously have all been associated with 360° angles of rotation so that depth data is detected in every direction around the depth scanning devices, angle 806 is shown to represent an angle that is less than 360°, such that depth scanning device 800 only detects depth data for surfaces inside angle 806 and abstains from detecting depth data outside angle 806.

To this end, depth scanning device 800 may be configured to use a realignment technique in which a mirror 818 disposed within scan head 804 and configured to rotate independently from scan head 804 is realigned to a starting place at one side of angle 806. For example, the realignment of mirror 818 may include a snap rotation in which scan head 804 spins in full 360° rotations during a sequence of depth scanning operations, but in which mirror 818 repeatedly "snap" rotates (i.e., rotates quickly to "snap" back into place) back over angle 806 so as to be able to follow each optic center 805 as it rotates across angle 806. In other words, each optic center 805 disposed on scan head 804 may be configured to rotate with scan head 804 in the full 360° rotations during the performance of a sequence of depth scanning operations. However, as scan head 804 and optic centers 805 rotate 360° during the sequence of depth scanning operations, mirror 818 may be configured to partially rotate (e.g., in phase with the rotating of scan head 804) so as to direct scan field 810 to pass through one optic center (e.g., optic center 805-1) as the optic center sweeps across angle 806. Then, after the optic center sweeps across angle 806 and before the next optic center (e.g., optic center 805-2) sweeps across angle 806, mirror 818 may perform the realignment (e.g., a snap rotation out of phase with the rotating of scan head 804 and possibly much faster and/or in an opposite direction as the rotating of scan head 804) to align mirror 818 with the next optic center (i.e., optic center 805-2, in this example). Subsequently, mirror 818 may again partially rotate (e.g., now in phase again with the rotating of scan head 804) so as to direct scan field 810 to pass through the next optic center as the next optic center sweeps across angle 806. The realignment of mirror 818 to be aligned with the next optic center may be performed in any suitable way, including by a snap rotation (as described above) or by any other type of counter rotation or positional reset in any rotational direction and/or at any speed as may serve a particular implementation.

To illustrate, FIG. 8A shows mirror 818 aligned such that scan field 810 is directed to pass through optic center 805-1 as optic center 805-1 is about to sweep across angle 806 (i.e., as indicated by rotational direction 808 of scan head 804). Subsequent to the moment illustrated by FIG. 8A, mirror 818 rotates in phase with scan head 804 (i.e., as indicated by the rotational arrow associated with mirror 818) so that scan field 810 follows optic center 805-1 around as scan head 804 rotates and optic center 805-1 sweeps across angle 806. FIG. 8B shows a moment subsequent to the moment shown in FIG. 8A where mirror 818 is still aligned so as to direct scan field 810 to pass through optic center 805-1 after optic center 805-1 has finished sweeping clockwise across angle 806 and immediately before optic center 805-2 begins sweeping across angle 806. As illustrated by the rotational arrows associated with mirror 818 and scan field 810, at this point, mirror 818 (i.e., as well as scan field 810) ceases rotation in phase with scan head 804 and ceases following optic center 805-1. Instead, mirror 818 performs a snap rotation out of phase with the rotating of scan head 804 so as to quickly return to the other side of angle 806, where optic center 805-2 is about to begin its sweep. In some examples, laser emission may be configured to stop or pause during the snap rotation and to resume when mirror 818 is aligned for the next scan rotation. FIG. 8C illustrates the result of this snap rotation. As shown, mirror 818 has rotated and realigned to its starting point to again direct scan field 810 toward the first side of angle 806 (this time passing through optic center 805-2).

The snap rotation illustrated to occur between FIGS. 8B and 8C may be performed in any suitable manner. For example, mirror 818 may be suspended within scan head 804 and configured to rotate independently from the rotation of scan head 804 (e.g., by way of one or more bearings included within scan head 804). The snap rotation of mirror 818 may be effected by any of various suitable mechanisms configured to implement a snap rotation (e.g., a quick rotation in an opposite direction to a direction of rotation associated with normal scanning) using, for example, potential energy derived and stored (e.g., within a spring or the like) by the system from the normal scanning rotation of mirror 818, or using energy provided by another suitable device (e.g., a motor, a stepper motor, or the like that is operating independently from a device being used to rotate scan head 804).

Accordingly, in some examples, the snap rotation may be implemented by an automatic mechanical mechanism that includes, for example, a tensioning mechanism (e.g., a spring or the like) configured to retain energy imparted to mirror 818 during normal scanning rotation (i.e., while mirror 818 rotates with scan head 804 between the moments illustrated by FIGS. 8A and 8B), a lock and release mechanism (e.g., a lever with a pin that locks and retains mirror 818 in a synchronous rotation with scan head 804 while the pin rotates through a cavity until reaching the end where the pin drops and releases the lock, thereby allowing the snap rotation to occur), a pressure plate and/or a slip ring configured to facilitate the locking of mirror 818 to scan head 804 during normal scanning, a series of gears and drive belts, and/or any other component or mechanism as may serve a particular implementation.

Additionally or alternatively, the snap rotation may be facilitated or completely implemented using an electrically-controlled, magnetically-controlled, logically-controlled (e.g., controlled by way of digital logic or computer instructions), or other suitable mechanism that operates in conjunction with or in place of mechanical mechanisms described above. For example, the snap rotation may involve a solenoid configured to snap back to an initial position, a stepper motor configured to quickly and precisely advance to a particular position, an actuator, a controller, and/or any other suitable mechanism configured to implement the snap rotation as may serve a particular implementation.

By continuing in the manner illustrated in FIGS. 8A-8C, where mirror 818 follows each optic center 805 across angle 806 and snaps back to be ready to follow the next optic center 805, depth scanning device 800 may perform multiple depth scanning operations in the amount of time it would take to perform a single 360° depth scanning operation (i.e., the time it takes scan head 804 to rotate all the way around 360°), thus providing a significant boost in efficiency and time on target. For instance, in this example, where scan head 804 includes four optic centers 805 and angle 806 is approximately 90°, depth scanning device 800 may perform four 90° depth scanning operations in the time it would take to perform one 360° depth scanning operation such as the depth scanning operations shown in FIG. 6. Such techniques, may result in an approximate four-fold increase in the amount of time the scan head is directed toward the scan area for each rotation.

While the snap rotation technique shown in FIGS. 8A through 8C illustrates an ideal case where the snap rotation of mirror 818 appears to take no time such that perfect efficiency for scanning a 90° angle is achieved, it will be understood that in real-world implementations, the snap rotation may take an appreciable amount of time, such that, for example, perhaps only three 90° depth scanning operations, rather than four, may be performed in the time that scan head 804 rotates all the way around. Regardless, the efficiency gains may still be very significant even in a non-ideal case. Additionally, while angle 806 is illustrated as being approximately a 90° angle, it will be understood that similar principles may be applied to other angles that are larger or smaller than 90°. For instance, a depth scanning device disposed on a side of a scan zone (e.g., at one of locations 516-3 or 516-6 of scan zone 500-4 above) may be configured to sweep 180° and then snap rotate back 180°, thus requiring only two optic centers, rather than four. Moreover, in certain examples, it will be understood that a snap rotation may be in the same rotational direction as the rotation of the scan head (i.e., in rotational direction 808), although the snap rotation may still be out of phase with (i.e., significantly faster than) the rotation of the scan head. For instance, in the example where a depth scanning device sweeps 180° from a location on a side of a scan zone, the depth scanning device may snap rotate the mirror forward 180° rather than back 180°.

As another example of how a depth scanning device may scan only across a particular angle, FIGS. 9A-9C illustrate an exemplary reverse rotation technique. Similar to FIGS. 8A-8C, each of FIGS. 9A-9C include a depth scanning device 900 with various components and aspects similar to depth scanning device 800 and other depth scanning devices described herein. While depth scanning device 900 is associated with a vantage point 902 and a scan head 904 similar to those of depth scanning device 800, depth scanning device 900 includes only a single optic center 905 disposed on a perimeter of scan head 904, in contrast to the plurality of optic centers 805 disposed on depth scanning device 800. Optic center 905 may be integrated into scan head 904 and thus configured to rotate with scan head 904.

Similar to depth scanning device 800, depth scanning device 900 is configured to rotate scan head 904 across an angle 906 (e.g., an angle formed where a pair of segments of a boundary of a scan zone meet) in a rotational direction 908 (e.g., one of rotational directions 908-1 or 908-2) in order to rotate a scan field 910 across angle 906 so as to detect depth data for surfaces included in a scan zone 912. As shown, depth scanning device 900 may further include a mirror 918 disposed within scan head 904 and configured to rotate in phase with the rotating of scan head 904 so as to direct scan field 910 to pass through optic center 905 as optic center sweeps across angle 905. As with angle 806, angle 906 represents an angle that is less than 360°, such that depth scanning device 900 similarly only detects depth data for surfaces inside angle 906 and abstains from detecting depth data outside angle 906.

To this end, depth scanning device 900 may be configured to use a reverse rotation technique in which scan head 904 and mirror 918 synchronously rotate back and forth in partial rotations (i.e., rotations less than 360°) to sweep scan field 910 back and forth over angle 906 in a manner analogous to a windshield wiper. In other words, in each depth scanning operation of a sequence of depth scanning operations, depth scanning device 900 may rotate scan head 904 so as to rotate optic center 905 and mirror 918 in rotational direction 908-1 (e.g., a clockwise direction in the example shown) to sweep scan field 910 across angle 906. Then, after optic center 905 sweeps across angle 906, depth scanning device 900 may switch from rotating optic center 905 and mirror 918 in rotational direction 908-1 to rotating optic center 905 and mirror 918 in rotational direction 908-2 (e.g., a rotational direction opposite to rotational direction 908-1, such as a counterclockwise direction in the example shown) to sweep scan field 910 back across angle 906. In other words, depth scanning device 900 may rotate scan head 904 and mirror 918 back and forth across angle 906 to cause scan field 910 to sweep over angle 906 in a manner analogous to a windshield wiper.

To illustrate, FIG. 9A shows scan head 904 (i.e., including optic center 905 and mirror 918) in a position where scan field 910 is passing through optic center 905 as scan head 904 is about to sweep optic center 905 and mirror 918 across angle 906 in rotational direction 908-1 (i.e., as indicated by the rotational arrows associated with mirror 918 and scan field 910). Subsequent to the moment illustrated by FIG. 9A, scan head 904 rotates so as to sweep scan field 910 across angle 906, and FIG. 9B shows the position of scan head 904, mirror 918, optic center 905, and scan field 910 when the sweep of angle 906 is complete (i.e., at a later moment than the moment illustrated in FIG. 9A). At the moment illustrated by FIG. 9B, the entire scan head (i.e., including optic center 905 and mirror 918) may reverse direction to rotate in rotational direction 908-2 (i.e., as indicated by the rotational arrows associated with mirror 918 and scan field 910) back over angle 906. FIG. 9C illustrates the result of this reverse rotation. As shown, scan head 904, mirror 918, optic center 905, and scan field 910 have swept over angle 906 again so as to complete an additional depth scanning operation and to be ready reverse directions yet again to sweep over angle 906 in the direction of rotational direction 908-1.

As with the snap rotation technique described above, by continuing in this manner of rotating scan head 904 to sweep back and forth over angle 906, depth scanning device 900 may perform multiple depth scanning operations in the amount of time it would take for the depth scanning device to perform a single 360° depth scanning operation (i.e., the time it would take scan head 904 to rotate all the way around 360°), thus providing a significant boost in efficiency. For instance, in this example where angle 906 is approximately 90°, depth scanning device 900 may perform approximately four depth scanning operations (i.e., two depth scanning operations in rotational direction 908-1 and two in rotational direction 908-2) in the time it would take to perform one 360° depth scanning operation such as the depth scanning operations shown in FIG. 6.

While the reverse rotation technique shown in FIGS. 9A through 9C illustrates an ideal case where scan head 904 appears to instantly decelerate, change directions, and accelerate to sweep back in an opposite direction with perfect efficiency, it will be understood that in real-world implementations, the reverse rotation may take an appreciable amount of time, such that, for example, perhaps only three 90° depth scanning operations, rather than four, may be performed in the time that scan head 904 rotates all the way around. Regardless, the efficiency gains may still be very significant even in a non-ideal case. Additionally, as mentioned above, it will be understood that similar principles may be applied to other angles that are larger or smaller than the approximately 90° angle 906 illustrated in FIGS. 9A through 9C.

To illustrate how partial rotation depth scanning operations performed using the exemplary techniques illustrated in FIGS. 8A-8C and 9A-9C or other suitable techniques may be applied during operation of a depth scanning system to perform efficient inward-looking depth scanning of a scan zone, two additional exemplary configurations will now be described.

Figure 10:
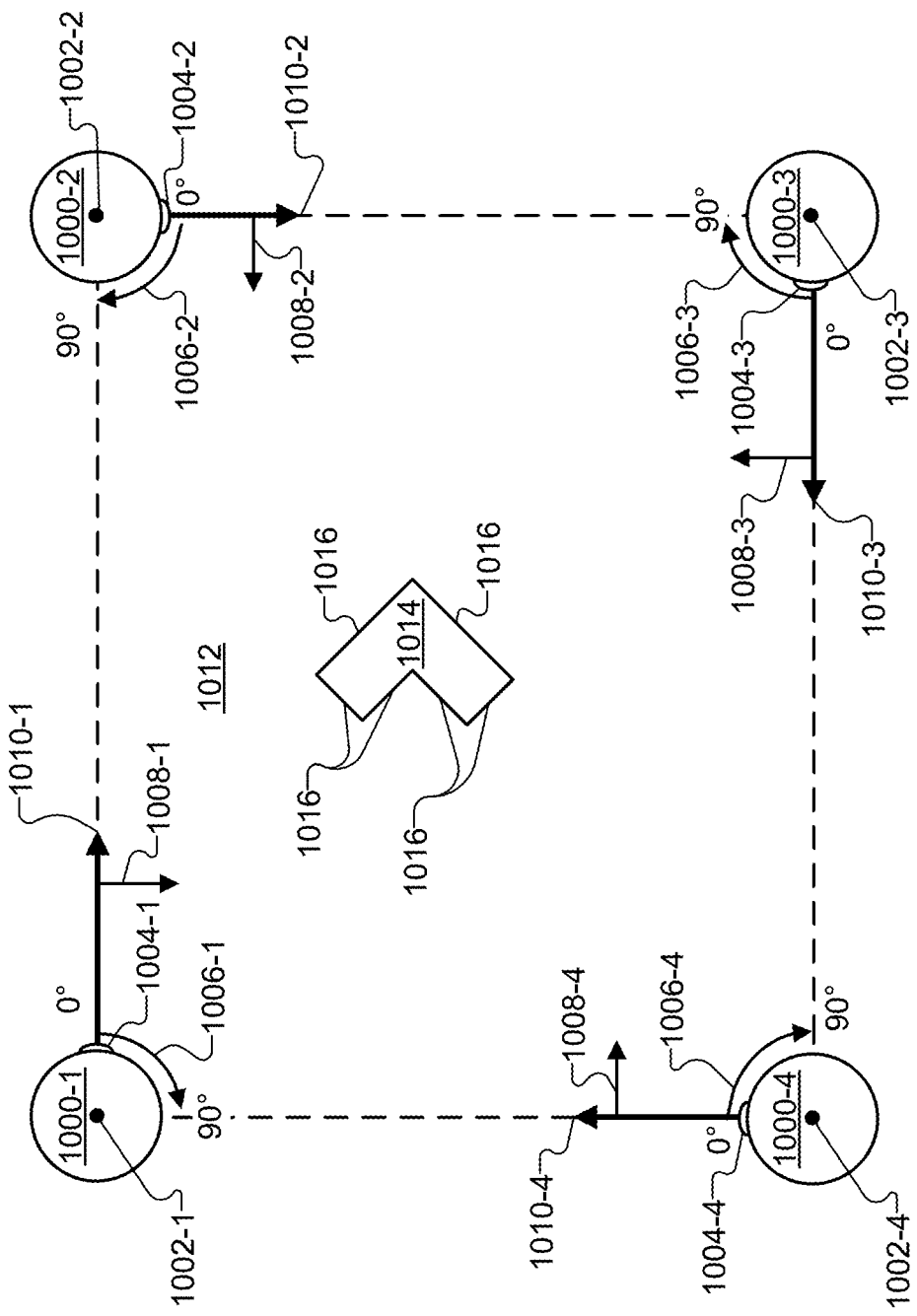
FIG. 10 illustrates a top view of an exemplary configuration in which an exemplary depth scanning system including a plurality of depth scanning devices performs efficient inward-looking depth scanning of an exemplary scan zone to detect depth data for surfaces included in the scan zone according to principles described herein.

FIG. 10 illustrates a top view of an exemplary configuration in which an exemplary depth scanning system (e.g., another depth scanning system implementing system 100) that includes a plurality of depth scanning devices performing efficient inward-looking depth scanning of an exemplary scan zone to detect depth data for surfaces included in the scan zone. Specifically, and in like manner as the depth scanning system of FIG. 6, the depth scanning system illustrated in FIG. 10 includes a plurality of depth scanning devices 1000 (e.g., depth scanning devices 1000-1 through 1000-4) disposed at respective locations associated with respective vantage points 1002 (i.e., vantage points 1002-1 through 1002-4). Additionally, as shown, depth scanning devices 1000 also include respective scan heads 1004 (i.e., scan heads 1004-1 through 1004-4) that rotate around respective angles 1006 (i.e., angles 1006-1 through 1006-4) in respective rotational directions that, in this example, are illustrated by clockwise motions 1008 (i.e., clockwise motions 1008-1 through 1008-4). In this way, depth scanning devices 1000 may sweep respective scan fields 1010 (i.e., scan fields 1010-1 through 1010-4) across respective angles 1006 to detect depth data for surfaces included in a real-world scene, and, in particular, surfaces included in a scan zone 1012. As with the configuration of FIG. 6, the inward-looking configuration of depth scanning devices 1000 in FIG. 10 allows multiple surfaces of an object 1014 (i.e., surfaces 1016) to be scanned to detect depth data for the surfaces.

To this end, the operation of depth scanning devices 1000 may be similar to the operation of depth scanning devices 600 in FIG. 6. However, whereas depth scanning devices 600 were configured to complete full 360° rotations (i.e., to detect depth data along 360° angles 606), each of depth scanning devices 1000 in FIG. 10 are configured to concurrently perform sequences of depth scanning operations in which depth data is detected for surfaces inside the respective angles 1006 but not for surfaces outside the respective angles 1006. Specifically, as shown, each depth scanning device 1000 in the depth scanning system implementation of FIG. 10 is configured to sweep its respective scan field 1010 across the 90° segment including scan zone 1012 and abstain from detecting depth data for surfaces in the respective 270° angles that do not include any portion of scan zone 1012.

Because it may only take approximately one fourth of the time to scan over 90° angles 1006 as it takes to scan over 360° angles 606, depth scanning devices 1000 may have time to perform additional depth scanning of scan zone 1012 that may not be possible otherwise. For example, by using snap rotations, reverse rotations, and/or other suitable techniques, depth scanning devices 1000 may perform several depth scans of scan zone 1012 in the time that it might otherwise take to perform a full 360° depth scan such as that shown in FIG. 6.

As shown, the configuration of FIG. 10 illustrates an example of inward-looking, phase-matched depth scanning of surfaces 1016 included within a scan zone contained within a rectangular boundary (i.e., scan zone 1012) using a depth scanning system having four depth scanning devices (i.e., depth scanning devices 1000). As used herein, it will be understood that a "rectangular boundary" may be a quadrilateral that at least approximates a rectangle (i.e., includes four sides and four corners that are approximately equal). As such, boundaries defining rectangles, squares, and/or other quadrilaterals (e.g., parallelograms, rhombuses, etc.) that have four angles that are all approximately equal (i.e., approximately 90°) may all be referred to herein as "rectangular boundaries."

As shown, the depth scanning system of FIG. 10 includes depth scanning device 1000-1 having scan head 1004-1 and configured to be disposed on the rectangular boundary of scan zone 1012 at a first vertex where a first pair of sides of the rectangular boundary meet to form angle 1006-1 (i.e., which includes scan zone 1012). Depth scanning device 1000-1 may be further configured to perform a first sequence of depth scanning operations in which depth scanning device 1000-1 detects (e.g., from vantage point 1002-1 of the first vertex) a first depth dataset for surfaces included within scan zone 1012 by rotating (e.g., for each depth scanning operation in the first sequence of depth scanning operations) scan head 1004-1 to sweep scan field 1010-1 across angle 1006-1. During the performance of this first sequence of depth scanning operations, depth scanning device 1000-1 may also be configured to abstain from detecting depth data for surfaces outside angle 1006-1.

As further shown, the depth scanning system of FIG. 10 includes depth scanning device 1000-2 having scan head 1004-2 and configured to be disposed on the rectangular boundary of scan zone 1012 at a second vertex where a second pair of sides of the rectangular boundary meet to form angle 1006-2 (i.e., which, like angle 1006-1, also includes scan zone 1012). Depth scanning device 1000-2 may be further configured to perform a second sequence of depth scanning operations in which depth scanning device 1000-2 detects (e.g., from vantage point 1002-2 of the second vertex) a second depth dataset for the surfaces included within scan zone 1012 by rotating (e.g., for each depth scanning operation in the second sequence of depth scanning operations) scan head 1004-2 to sweep scan field 1010-2 across angle 1006-2. During the performance of this second sequence of depth scanning operations, depth scanning device 1000-2 may also be configured to abstain from detecting depth data for surfaces outside angle 1006-2.

As further shown, the depth scanning system of FIG. 10 includes depth scanning device 1000-3 having scan head 1004-3 and configured to be disposed on the rectangular boundary of scan zone 1012 at a third vertex where a third pair of sides of the rectangular boundary meet to form angle 1006-3 (i.e., which, like angles 1006-1 and 1006-2, includes scan zone 1012). Depth scanning device 1000-3 may be further configured to perform a third sequence of depth scanning operations in which depth scanning device 1000-3 detects (e.g., from vantage point 1002-3 of the third vertex) a third depth dataset for the surfaces included within scan zone 1012 by rotating (e.g., for each depth scanning operation in the third sequence of depth scanning operations) scan head 1004-3 to sweep scan field 1010-3 across angle 1006-3. During the performance of this third sequence of depth scanning operations, depth scanning device 1000-3 may also be configured to abstain from detecting depth data for surfaces outside angle 1006-3.

Additionally, as further shown, the depth scanning system of FIG. 10 includes depth scanning device 1000-4 having scan head 1004-3 and configured to be disposed on the rectangular boundary of scan zone 1012 at a fourth vertex where a fourth pair of sides of the rectangular boundary meet to form angle 1006-4 (i.e., which, like angles 1006-1 through 1006-3 includes scan zone 1012). Depth scanning device 1000-4 may be further configured to perform a fourth sequence of depth scanning operations in which depth scanning device 1000-4 detects (e.g., from vantage point 1002-4 of the fourth vertex) a fourth depth dataset for the surfaces included within scan zone 1012 by rotating (e.g., for each depth scanning operation in the fourth sequence of depth scanning operations) scan head 1004-4 to sweep scan field 1010-4 across angle 1006-4. During the performance of this fourth sequence of depth scanning operations, depth scanning device 1000-4 may also be configured to abstain from detecting depth data for surfaces outside angle 1006-4.

The first through fourth depth datasets described above may be captured and provided for any suitable purpose. For instance, an implementation of system 100 that includes depth scanning devices 1000 may further include a computing device (not explicitly shown in FIG. 10) configured to receive the first, second, third, and fourth depth datasets; to correlate the first, second, third, and fourth depth datasets based on a synchronization signal (e.g., including timecodes or the like) included as metadata with each of the depth datasets (e.g., to associate or line up depth data from each depth dataset that was detected at approximately the same time based on the synchronization signal); and to generate a depth map of the surfaces included within the scan zone based on the correlated depth datasets.

In certain examples, each of the sequences of depth scanning operations performed by depth scanning devices 1000 (i.e., the first through the fourth sequences of depth scanning operations mentioned above) may be performed concurrently with one another. In other words, the operation of each depth scanning device 1000 make take place during a same period of time such that depth data for surfaces included within scan zone 1012 is detected from multiple different vantage points during the same period of time (e.g., allowing depth data detected at approximately the same time by different depth scanning devices to be correlated and used to generate a depth map of the surfaces, as described above).

Moreover, in some of these examples, each of the depth scanning operations performed by depth scanning devices 1000 may be synchronized or configured to be in phase with other corresponding depth scanning operations being performed by the other depth scanning devices 1000. For example, the depth scanning devices 1000-1 and 1000-2 may be synchronized to perform in-phase pairs of depth scanning operations in which each depth scanning operation performed by depth scanning device 1000-1 as part of the first sequence of depth scanning operations is synchronous and in phase with a corresponding depth scanning operation performed by depth scanning device 1000-2 as part of the second sequence of depth scanning operations, and so forth for depth scanning devices 1000-3 and 1000-4.

As used herein, events may be considered to be "synchronous" or to occur "at a same moment" when the events happen in precise synchronization or at precisely the same moment, as well as when the synchronization is only approximate and/or when the events happen at approximately the same moment. For example, a depth scanning system (e.g., system 100) may be configured to cause depth scanning devices to operate synchronously (i.e., in phase with one another) but may be unable to keep the depth scanning devices in perfect synchronization all the time (e.g., one depth scanning device may be a few milliseconds or degrees out of phase from another at least during certain depth scanning operations or some portions of a given depth scanning operation).

Figure 11:
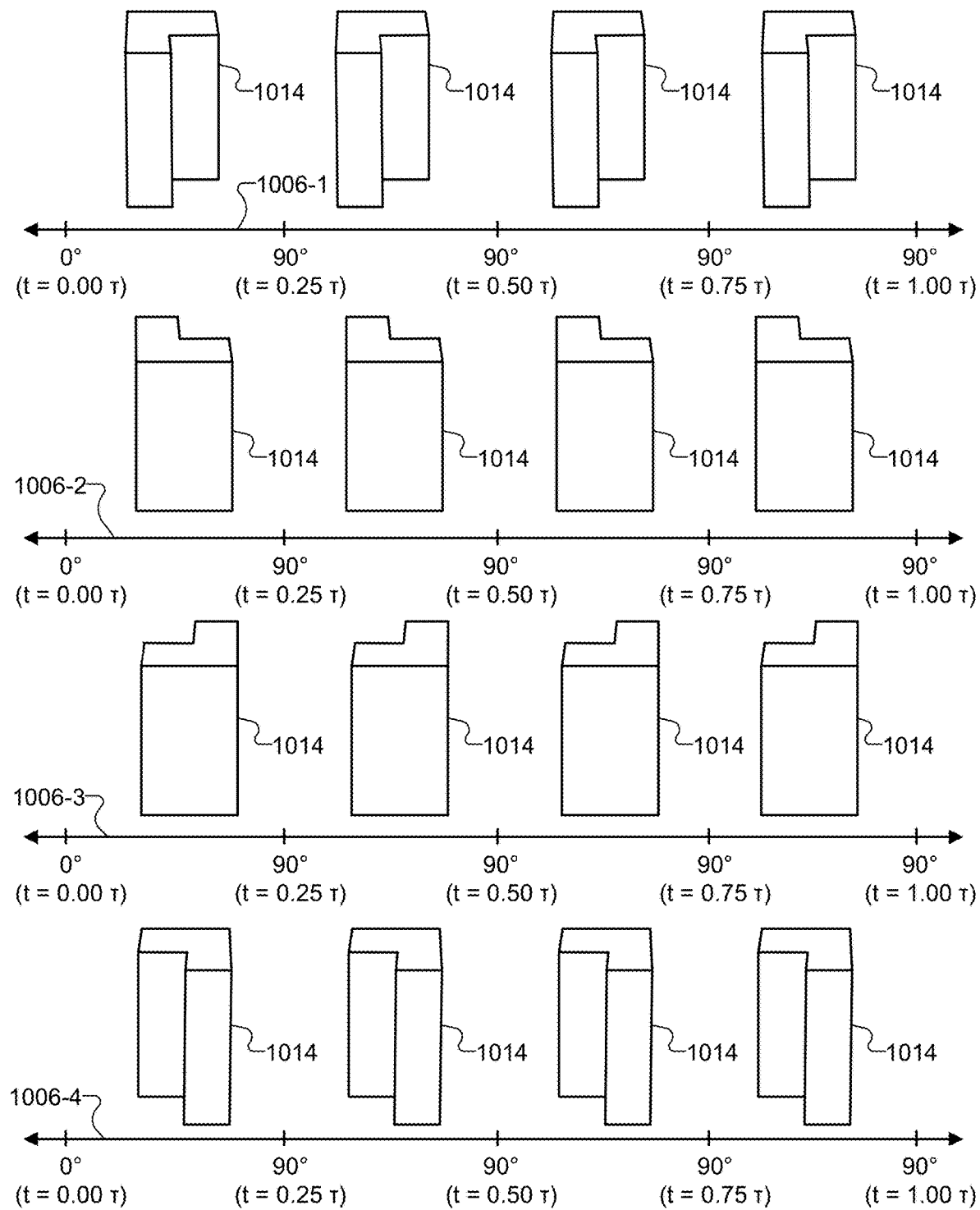
FIG. 11 illustrates exemplary depth scan details for each of the depth scanning devices illustrated in FIG. 10 according to principles described herein.

FIG. 11 illustrates how the configuration of FIG. 10 improves not only the synchronicity with which the surfaces included within a scan zone are scanned (i.e., as compared to FIG. 7 above), but also how the configuration of FIG. 10 leads to gains in efficiency as compared, for example, with the configuration of FIG. 6. Specifically, FIG. 11 illustrates exemplary depth scan details for a plurality of depth scanning operations performed by each of depth scanning devices 1000 in a similar format to the depth scan details illustrated in FIG. 7. Whereas the depth scan details illustrated in FIG. 7 illustrate timing of when surfaces of an object (i.e., object 614) is scanned with respect to a single 360° depth scanning operation (i.e., taking place over a scan time period represented by "τ"), the depth scan details illustrated in FIG. 11 show that, during the same scan time period ("τ") represented in FIG. 7, the depth scanning system implementation of FIG. 10 may perform four 90° depth scanning operations over angles 1006 associated with scan zone 1012. Specifically, as shown, each angle 1006 (i.e., angles 1006-1 through 1006-4) is represented four consecutive times in FIG. 11 to show how depth data for surfaces of object 1014 may be detected at approximately four times the scan frequency provided by the other depth scanning system implementations. This increased scan frequency may be beneficial in certain implementations, particularly in implementations where object 1014 and/or other objects or surfaces included within scan zone 1012 are dynamic (e.g., moving quickly, in constant motion, etc.).

In certain examples, further adjustments may also be made to the configuration of FIG. 10 to further improve the synchronicity with which objects included within a scan zone are scanned. For example, a depth scanning system may implement at least one synchronous pair of depth scanning devices in which first and second depth scanning devices in the synchronous pair are synchronized to perform in-phase pairs of depth scanning operations in which each depth scanning operation performed by the first depth scanning device as part of a first sequence of depth scanning operations is in phase with a corresponding depth scanning operation performed by the second depth scanning device as part of a second sequence of depth scanning operations, and in which each in-phase pair of depth scanning operations performed by the first and second depth scanning devices is configured such that the first scan field aims at the second vantage point at a same moment during the in-phase pair of depth scanning operations when the second scan field aims at the first vantage point.

Just as events that occur at approximately the same moment may be considered to be "synchronous" or to occur "at a same moment," as described above, it will be understood that when the depth scanning system in this example causes the first scan field to aim at the second vantage point and the second scan field to aim at the first vantage point "at a same moment," the depth scanning system may actually cause the respective scan fields to aim at the respective vantage points at distinct times that are only approximately the same (e.g., a few milliseconds away from one another in certain embodiments) due to imperfections of the synchronicity between the depth scanning devices. In a similar way, it will be understood that the aiming of a scan field at a particular vantage point (e.g., the first scan field aiming at the second vantage point or the second scan field aiming at the first vantage point), as used herein, may refer to an approximate aiming of the scan field at the particular vantage point. For instance, the scan field may be directed at a point a few degrees off from the vantage point and still be considered to be "aiming at" the vantage point in certain implementations.

Figure 12:
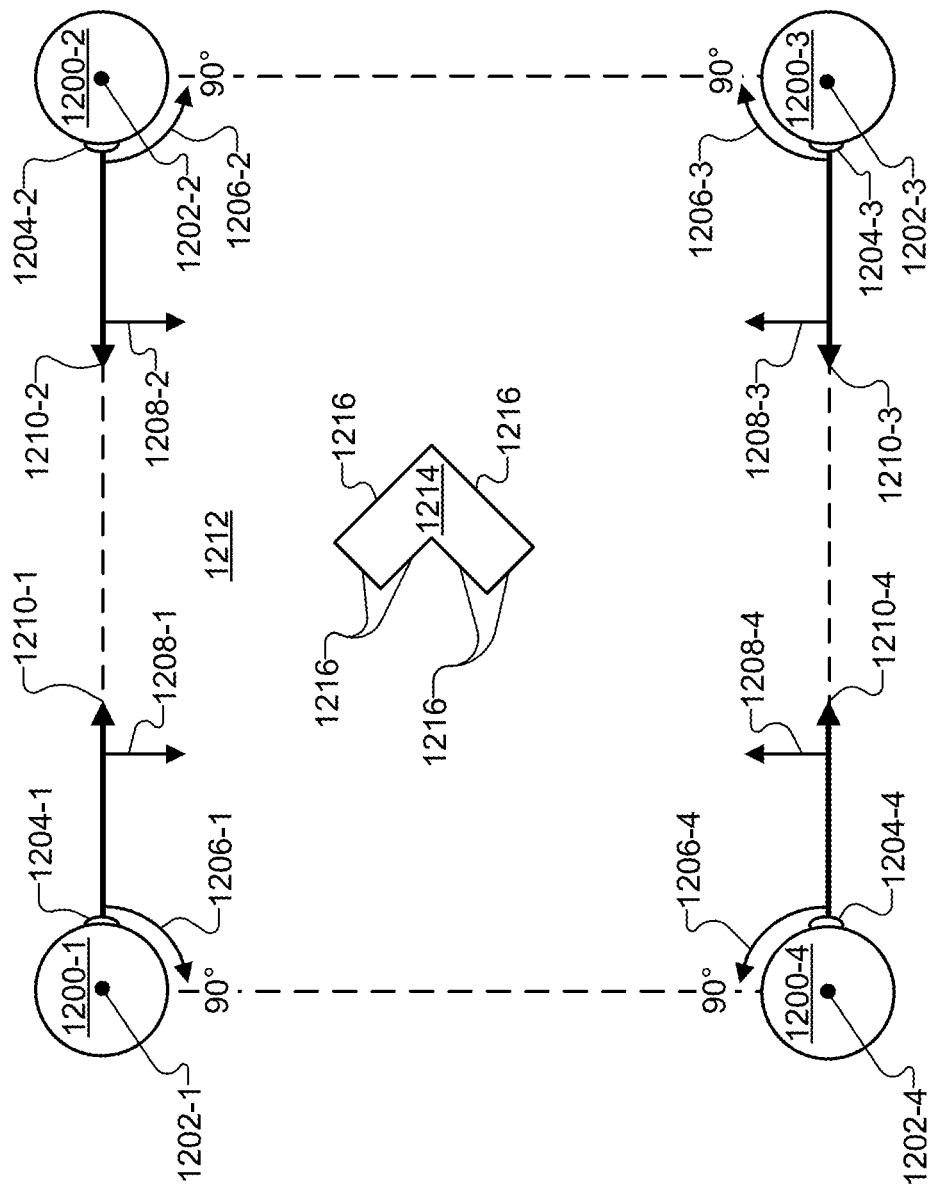
FIG. 12 illustrates a top view of another exemplary configuration in which an exemplary depth scanning system including a plurality of depth scanning devices performs efficient inward-looking depth scanning of an exemplary scan zone to detect depth data for surfaces included in the scan zone according to principles described herein.

To illustrate an implementation that employs synchronous pairs of depth scanning devices, FIG. 12 shows a top view of another exemplary configuration in which an exemplary depth scanning system including a plurality of depth scanning devices 1200 performs inward-looking depth scanning of an exemplary scan zone, similar to FIG. 10. Specifically, similar to the depth scanning system of FIG. 10, the depth scanning system illustrated in FIG. 12 includes a plurality of depth scanning devices 1200 disposed at respective locations associated with respective vantage points 1202 (i.e., vantage points 1202-1 through 1202-4). Additionally, as shown, depth scanning devices 1200 also include respective scan heads 1204 (i.e., scan heads 1204-1 through 1204-4) that rotate around respective angles 1206 (i.e., angles 1206-1 through 1206-4) in respective rotational directions 1208 (i.e., rotational directions 1208-1 through 1208-4) so as to progressively aim respective scan fields 1210 (i.e., scan fields 1210-1 through 1210-4) to sweep across surfaces included in a scan zone 1212. As with the configuration of FIG. 10, the inward-looking configuration of depth scanning devices 1200 in FIG. 12 allows multiple surfaces of an object 1214 (i.e., surfaces 1216) to be scanned to detect depth data for the surfaces.

To this end, the operation of depth scanning devices 1200 may be similar to the operation of depth scanning devices 1000 in FIG. 10. However, whereas depth scanning devices 1000 all rotated in clockwise rotational directions (i.e., clockwise motions 1008-1 through 1008-4) and no depth scanning device 1000 aimed its scan field at a vantage point of another depth scanning device 1000 whose scan field was aiming back at a particular moment, depth scanning devices 1200 in FIG. 12 are configured to operate in synchronous pairs such that scan fields do aim at vantage points of paired depth scanning devices 1200 at particular moments within each synchronous depth scanning operation. For instance, as shown, at a particular moment during each depth scanning operation (e.g., at the beginning or end of each depth scanning operation), certain scan heads 1204 are configured to aim at one another. For example, depth scanning devices 1200-1 and 1200-2 are shown to be synchronously paired in this way. At the moment illustrated in FIG. 12 (e.g., a moment at the beginning or end of a depth scanning operation, a moment in the middle of a depth scanning operation, etc.), scan field 1210-1 of depth scanning device 1200-1 is aimed at vantage point 1202-2 of depth scanning device 1200-2 at the same time that scan field 1210-2 of depth scanning device 1200-2 is aimed at vantage point 1202-1 of depth scanning device 1200-1. As shown, depth scanning devices 1200-4 and 1200-3 synchronously paired with one another in a similar way.

Moreover, as shown, while depth scanning devices 1200-1 and 1200-3 rotate in a clockwise motion from the perspective of a common reference point above scan heads 1204, depth scanning devices 1200-2 and 1200-4 are configured to rotate in an opposite rotational direction (i.e., in a counterclockwise motion from the perspective of the common reference point). Accordingly, depth scanning devices 1200-1 and 1200-4 are also synchronously paired such that scan field 1210-1 of depth scanning device 1200-1 will be aimed at vantage point 1202-4 of depth scanning device 1200-4 at a same moment (e.g., a later moment in the depth scanning operation than the moment illustrated by FIG. 12) that scan field 1210-4 of depth scanning device 1200-4 is aimed at vantage point 1202-1 of depth scanning device 1200-1. In like manner, depth scanning devices 1200-2 and 1200-3 are also synchronously paired with one another in a similar way.

While the examples illustrated in FIG. 12 and other figures above illustrates a scan zone contained within a quadrilateral (e.g., a rectangle, a parallelogram, a rhombus, etc.) that is bounded by four depth scanning devices disposed at the corners of the quadrilateral, it will be understood that other numbers of depth scanning devices bounding other shapes containing scan zones (e.g., scan zones such as those shown in FIG. 5) may also be employed in certain implementations. For example, a depth scanning system including two depth scanning devices may perform inward-looking, phase-matched depth scanning of a scan zone located between the two depth scanning devices; a depth scanning system including three depth scanning devices may perform inward-looking, phase-matched depth scanning of a scan zone contained within a triangle bounded at the corners by the three depth scanning devices; a depth scanning system including more than four depth scanning devices may perform inward-looking, phase-matched depth scanning of a scan zone contained within these or other shapes bounded by the depth scanning devices in any suitable manner; and so forth as may serve a particular implementation.

Additionally, while drawings and examples provided herein have focused on implementations where scan heads of depth scanning devices rotate on vertical axes with respect to the scan zone (i.e., to scan the scan zone horizontally), it will be understood that it may also be advantageous, in certain examples, to implement a depth scanning system in which depth scanning devices are effectively turned on their sides such that scan heads of the depth scanning devices rotate on horizontal axes with respect to the scan zone (i.e., to scan the real-world scene vertically). In these examples, additional depth scanning devices may be employed beyond single depth scanning devices at each corner of a scan zone. For instance, a line of horizontally oriented depth scanning devices may be disposed along each side of a scan zone and be configured to vertically scan up and/or down a relatively small angle (e.g., 20°-30° in certain examples) of the scan zone, thereby allowing even more depth scanning operations to be completed in a given period of time (e.g., as compared to configurations such as those illustrated in FIGS. 10 and 12 where 90° depth scanning operation are performed). Additionally, in certain examples, implementations that leverage both vertical and horizontal scanning may also be implemented to provide benefits described herein for both horizontal and vertical scanning.

Figure 13:
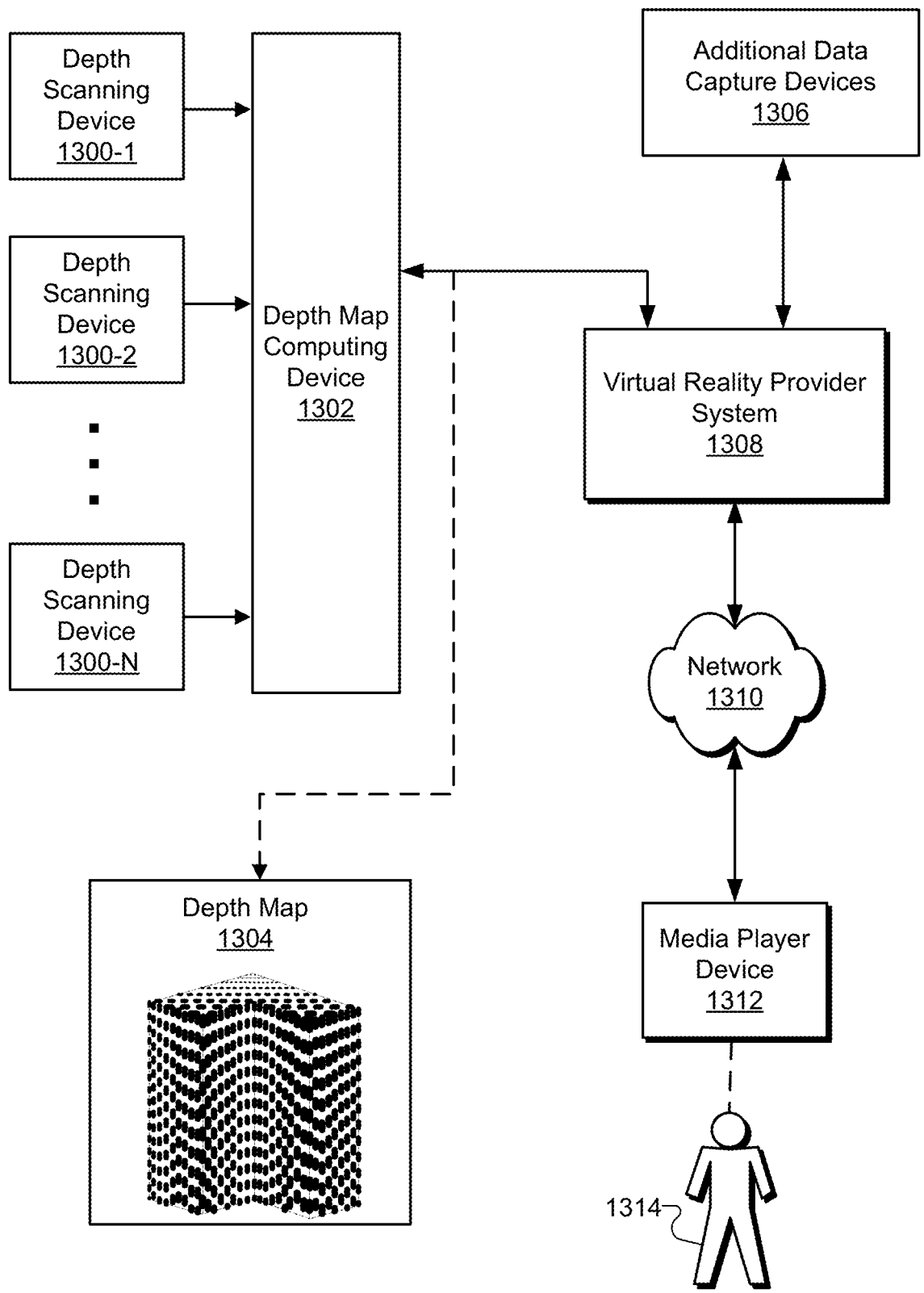
FIG. 13 illustrates an exemplary configuration in which an exemplary depth scanning system is used to provide virtual reality media content to a media player device associated with a user according to principles described herein.

To illustrate how depth data detected by the depth scanning system implementations described herein may be used, FIG. 13 shows an exemplary configuration in which an exemplary depth scanning system is used to provide virtual reality media content to a media player device associated with a user. Specifically, as shown in FIG. 13, a plurality of depth scanning devices 1300 (e.g., depth scanning devices 1300-1 through 1300-N) may be communicatively coupled with a depth map computing device 1302, which may generate a depth map 1304 that is provided, along with data generated by additional data capture devices 1306, to a virtual reality provider system 1308. Virtual reality provider system 1308 may generate virtual reality media content based on the received depth map and provide, by way of a network 1310, the virtual reality media content to a media player device 1312 associated with a user 1314.

While a depth scanning system such as system 100 is not explicitly labeled in FIG. 13, it will be understood that the components shown may constitute an implementation of a depth scanning system. For example, in some implementations, the depth scanning system may include depth scanning devices 1300 only, or depth scanning devices 1300 and depth map computing device 1302. The depth scanning system may be communicatively coupled with virtual reality provider system 1308 along with additional data capture device 1306 (e.g., which may detect or capture types of data other than depth data). In other implementations, the depth scanning system may include not only depth scanning devices 1300 and depth map computing device 1302, but also part or all of virtual reality provider system 1308 and/or one or more additional data capture devices 1306. Each of the elements illustrated in FIG. 13 will now be described in more detail.

Depth scanning devices 1300 may be implemented by any of the depth scanning devices described herein and may operate in similar or identical ways as other disclosed depth scanning devices and in similar or identical configurations as those described above. For example, each depth scanning device 1300 may be implemented as a LIDAR device configured to detect depth data based on a time of flight of a laser pulse emitted by the LIDAR device and that reflects from surfaces included within a scan zone to be detected by the LIDAR device from a particular vantage point. Additionally, as described above, each depth scanning device 1300 may be synchronized with one another using a synchronization signal such as a series of pulses generated by a master clock included in the depth scanning system (not explicitly shown). Moreover, each depth scanning device 1300 may maintain a running time such that depth data detected by depth scanning devices 1300 may be marked or labeled with a timecode representative of the time at which the depth data was detected. In other words, metadata representative of a timecode at which depth data is detected may be added to or included with the depth data by depth scanning devices 1300.

Depth map computing device 1302 may be implemented by a computer server or by any other type of computing device described herein and, as such, may include any hardware and/or software components for performing any of the operations described herein as may serve a particular implementation. In particular, depth map computing device 1302 may be configured to perform operations such as receiving (e.g., from depth scanning devices 1300) detected depth data for surfaces included within a scan zone from respective vantage points of depth scanning devices 1300, and generating depth map 1304 of the surfaces based on the received detected depth data for the surfaces. For example, using timecodes and/or other aspects of synchronization signals included as metadata with the depth data, depth map computing device 1302 may process depth data from various depth scanning devices 1300 to form a single, multiple-perspective depth map such as depth map 1304. In some examples, after generating depth map 1304, depth map computing device 1302 may further be configured to perform operations such as providing depth map 1304 to virtual reality provider system 1308 for use by virtual reality provider system 1308 in generating and providing virtual reality media content to media player device 1312 associated with user 1314.

Depth map 1304 may be generated by depth map computing device 1302 and may represent depth data from one or more perspectives (e.g., one or more of the vantage points associated with depth scanning devices 1300) around the scan zone. For example, as mentioned above, by including depth data detected by multiple depth scanning devices 1300, depth map 1304 may be a multiple-perspective depth map representing more surfaces of objects included in the scan zone than may be detectable from any single vantage point. In some examples, depth map 1304 may include a 4D representation of the surfaces with respect to a 3D global coordinate system (i.e., a global coordinate system in 3D space) and with respect to a temporal dimension. In other words, depth map 1304 may include data allowing a volumetric representation of objects and surfaces included within the scan zone to be recreated throughout a period of time. In other examples, depth map 1304 may be represented by a plurality of images (e.g., grayscale images) representative of depth data from each of the vantage points of depth scanning devices 1300. For example, each image may be associated with a timecode allowing multiple images detected at the same time to be correlated with one another, and may include a grayscale value for each pixel in the image that represents the depth of a surface represented by the pixel (e.g., where values closer to white are further from the vantage point and values closer to black are closer to the vantage point, or vice versa).

Depth data 1304 may depict surfaces included within the scan zone in any suitable manner and/or using any suitable format. As one example, depth data 1304 may represent the depth (i.e., the distance or position) of each point on the surfaces of an object relative to a particular vantage point using a grayscale image format. For instance, as depicted in FIG. 13, rather than representing how light reflects from the surfaces of the object as may be represented in a color model, a grayscale image of depth map 1304 may represent, for each pixel in the image, how far away the point represented by that pixel is from a particular reference point (e.g., the particular vantage point, a global reference point for a global 3D coordinate system, etc.). For example, points that are closer to depth capture device 506 may be represented with values that represent darker shades of gray, while points that are farther away from depth capture device 506 may be represented with values that represent lighter shades of gray.

Additional data capture devices 1306 may represent any suitable systems or devices that may further capture data used by virtual reality provider system 1308 to generate the virtual reality media content. For example, while depth scanning systems described herein focus on detecting depth data for surfaces within a scan zone, additional data capture devices 1306 integrated with depth scanning systems and/or otherwise interoperating with depth scanning systems may similarly detect texture data for the same surfaces for which depth data 1304 is captured (e.g., two-dimensional color video data), audio data, metadata, and/or other types of data that may be used to realistically represent a scan zone within a virtual reality world associated with virtual reality media content. For example, texture capture devices may complement depth scanning devices (e.g., by being aligned, synchronized, and/or disposed in corresponding locations with the depth scanning devices) such that a depth and texture map or image of surfaces included within the real-world scene may be generated to represent both texture (e.g., color) and depth (e.g., position) for each pixel in the depth and texture map or image.

To this end, virtual reality provider system 1308 may be associated with a virtual reality provider entity and may include any hardware and/or software (e.g., one or more server computers, etc.) configured to process depth data received from depth map computing device 1302 and/or from depth scanning devices 1300 (e.g., depth map 1304) as well as other types of data received from other sources (e.g., from additional data capture devices 1306) to generate virtual reality media content that may be provided to client-side media player devices to be experienced by users. As will be described in more detail below, the virtual reality media content generated and provided by virtual reality provider system 1308 may be configured to be experienced by users (e.g., user 1314) by way of media player devices (e.g., media player device 1312) and to be experienced from dynamically selectable virtual viewpoints selected by the users within virtual reality worlds associated with the virtual reality media content.

Network 1310 may include a provider-specific wired or wireless network (e.g., a cable or satellite carrier network or a mobile telephone network), the Internet, a wide area network, a content delivery network, or any other suitable network. Data may flow between virtual reality provider system 1308 and one or more media player devices such as media player device 1312 using any communication technologies, devices, media, and protocols as may serve a particular implementation.

Media player device 1312 may be used by user 1314 to access and experience virtual reality media content provided by virtual reality provider system 1308. For example, media player device 1312 may be configured to generate a virtual reality world representative of a scan zone being scanned by depth scanning devices 1300 to be experienced by user 1314 from an arbitrary virtual viewpoint (e.g., a dynamically selectable virtual viewpoint selected by the user and corresponding to an arbitrary virtual location within the virtual reality world representative of the scan zone). To this end, media player device 1312 may include or be implemented by any device capable of presenting a field of view of a virtual reality world and detecting user input from user 1314 to dynamically update the part of the virtual reality world presented within the field of view as user 1314 experiences the virtual reality world.

Figure 14:
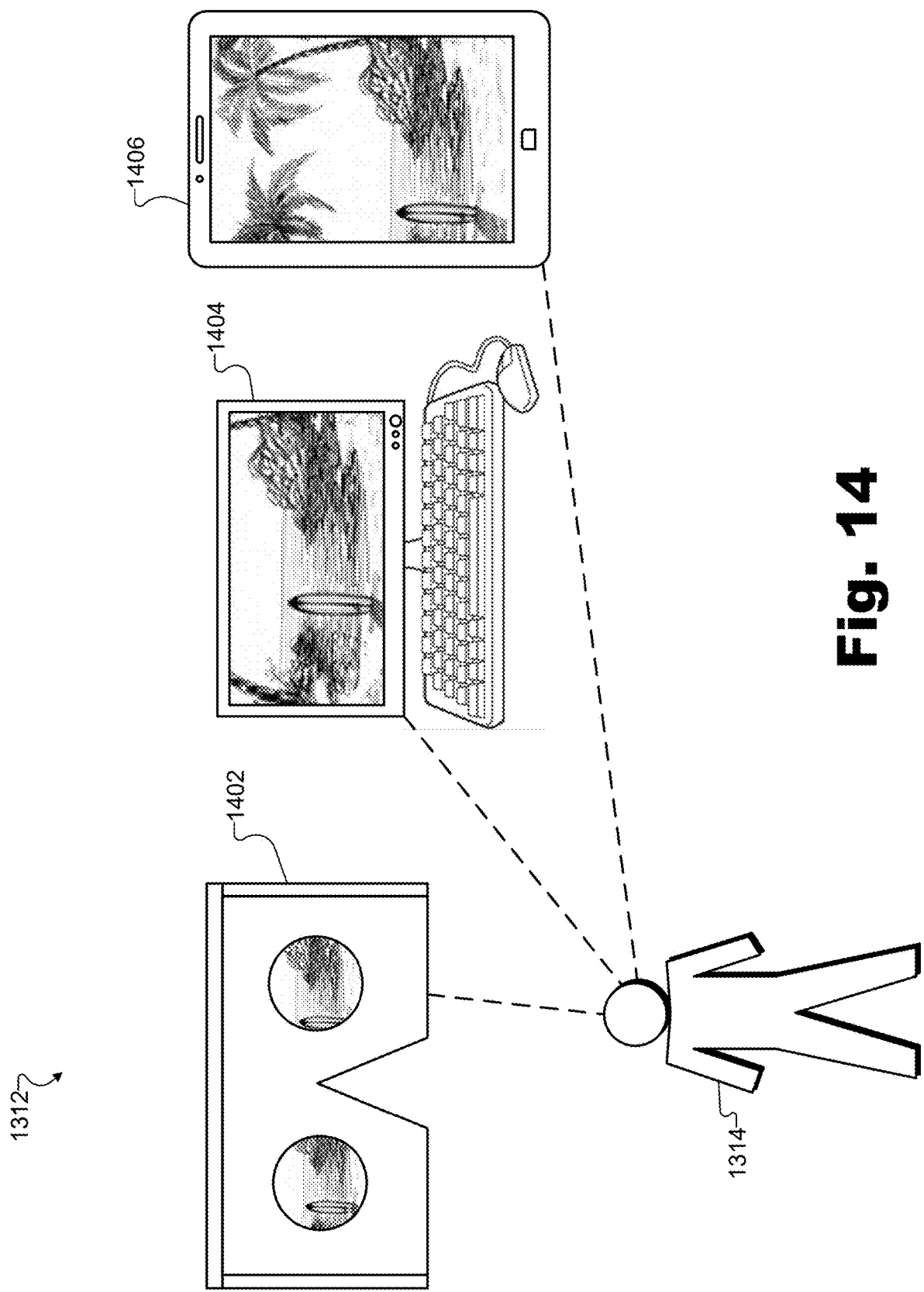
FIG. 14 illustrates exemplary types of media player devices that may be included within the configuration of FIG. 13 for use by a user in experiencing virtual reality media content according to principles described herein.

FIG. 14 illustrates exemplary types of media player devices that may be included within the configuration of FIG. 13 (i.e., to implement media player device 1312 or another media player device to which the virtual reality media content is provided) for use by user 1314 in experiencing the virtual reality media content. Specifically, as shown, media player device 1312 may take one of several different form factors such as a head-mounted virtual reality device 1402 (e.g., a virtual reality gaming device) that includes a head-mounted display screen, a personal computer device 1404 (e.g., a desktop computer, laptop computer, etc.), a mobile or wireless device 1406 (e.g., a smartphone, a tablet device, etc., possibly mounted to the head of user 1314 by means of a head mount apparatus), or by any other device or configuration of devices that may serve a particular implementation to facilitate receiving and/or presenting virtual reality media content. Different types of media player devices (e.g., head-mounted virtual reality devices, personal computer devices, mobile devices, etc.) may provide different types of virtual reality experiences having different levels of immersiveness for user 1314.

Figure 15:
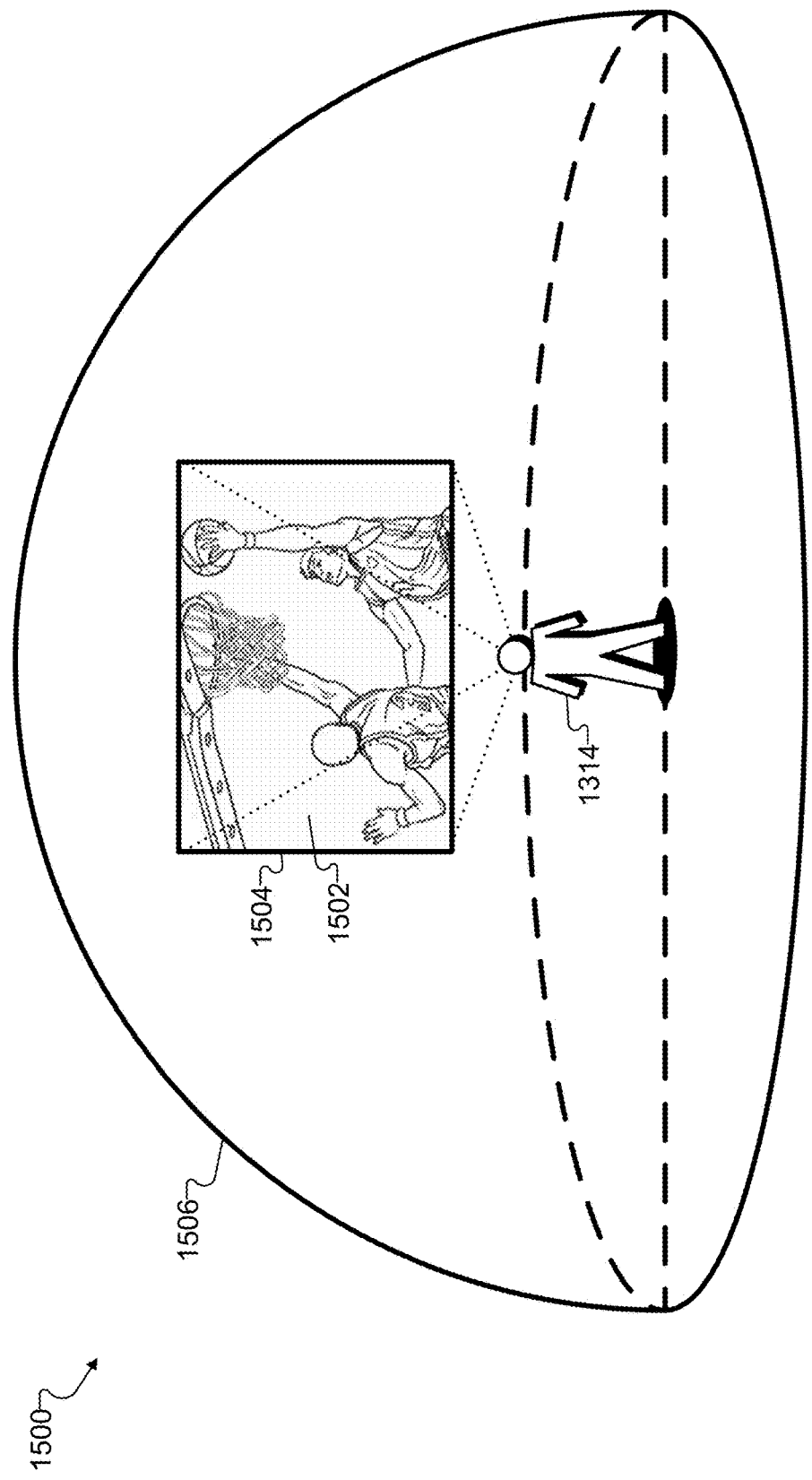
FIG. 15 illustrates an exemplary virtual reality experience in which a user is presented with exemplary virtual reality media content associated with a virtual reality world as experienced from a dynamically selectable virtual viewpoint within the virtual reality world according to principles described herein.

FIG. 15 illustrates an exemplary virtual reality experience 1500 in which user 1314 is presented with exemplary virtual reality media content (e.g., virtual reality media content generated and provided by virtual reality provider system 1308) associated with a virtual reality world as experienced from a dynamically selectable virtual viewpoint within the virtual reality world. Specifically, as shown, virtual reality media content 1502 may be presented within a field of view 1504 that shows a virtual reality world 1506 from a virtual viewpoint corresponding to an arbitrary virtual location right underneath a basketball standard within the representation of virtual reality world 1506 where a shot is being made. User 1314 experiences virtual reality world 1506 by providing user input (e.g., head movements, keyboard input, etc.) to look around and/or to move around (i.e., dynamically select a virtual viewpoint from which to experience) virtual reality world 1506.

For example, field of view 1504 may provide a window through which user 1314 may easily and naturally look around a virtual representation of a scan zone for which depth data and/or other types of data have been detected. Field of view 1504 may be presented by media player device 1312 (e.g., on a display screen of media player device 1312) and may include video depicting objects surrounding user 1314 within virtual reality world 1506. Additionally, field of view 1504 may dynamically change in response to user input provided by user 1314 as user 1314 experiences virtual reality world 1506. For example, media player device 1312 may detect user input (e.g., moving or turning the display screen upon which field of view 1504 is presented). In response, field of view 1504 may display different objects and/or objects seen from a different virtual viewpoint or virtual location in place of the objects seen from the previous virtual viewpoint or virtual location.

In FIG. 15, virtual reality world 1506 is illustrated as a semi-sphere, indicating that user 1314 may look in any direction within virtual reality world 1506 that is substantially forward, backward, left, right, and/or up from the virtual viewpoint of the location under the basketball standard that user 1314 has currently selected. In other examples, virtual reality world 1506 may include an entire 360° by 180° sphere such that user 1314 may also look down. Additionally, user 1314 may move around to other locations within virtual reality world 1506 (i.e., dynamically selecting different dynamically selectable virtual viewpoints). For example, user 1314 may select a virtual viewpoint at half court, a virtual viewpoint from the free-throw line facing the basketball standard, a virtual viewpoint suspended above the basketball standard, or the like.

Figure 16:
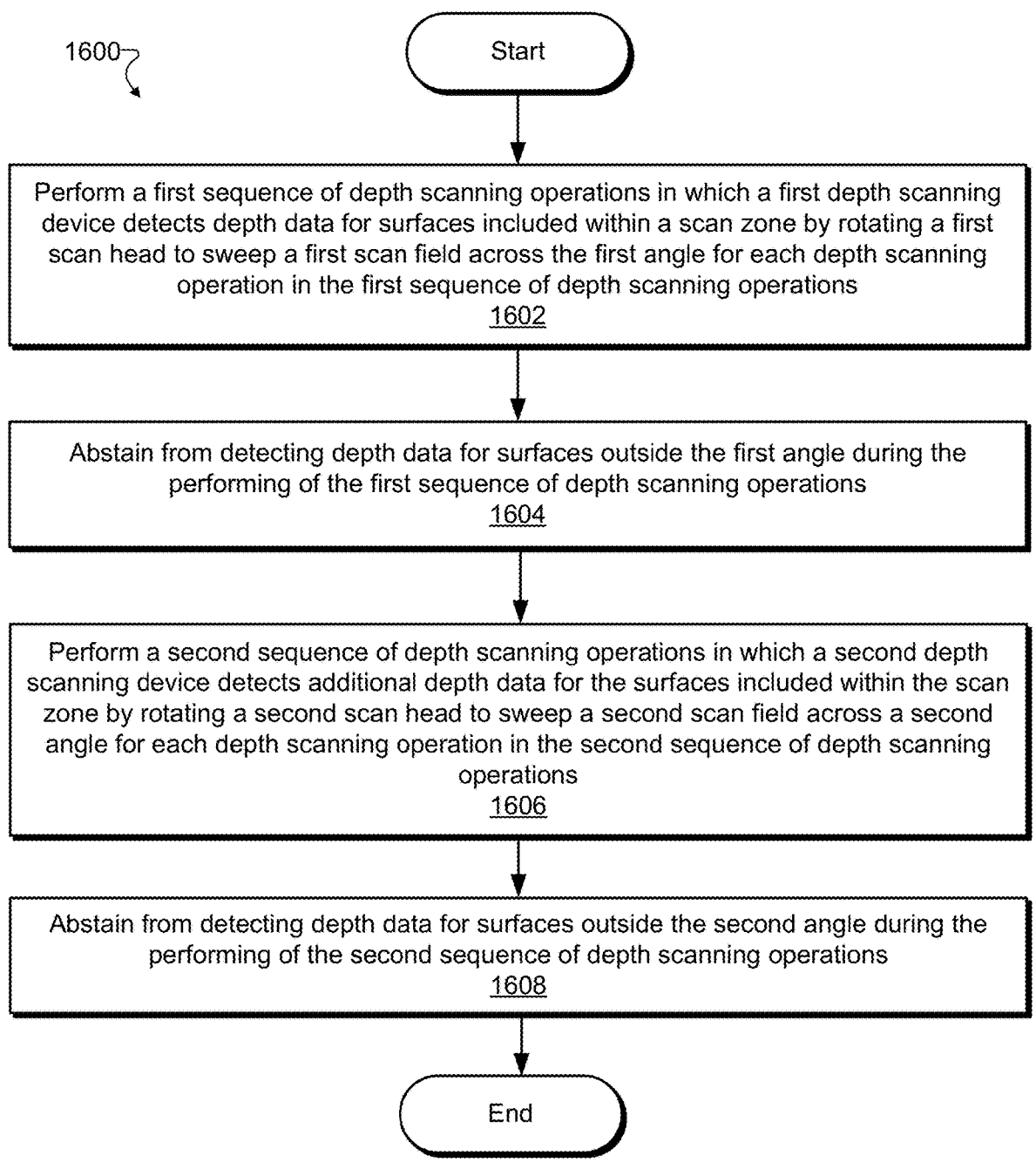
FIG. 16 illustrates an exemplary method for efficient inward-looking depth scanning of a scan zone according to principles described herein.

FIG. 16 illustrates an exemplary method 1600 for inward-looking depth scanning of a scan zone. While FIG. 16 illustrates exemplary operations according to one embodiment, other embodiments may omit, add to, reorder, and/or modify any of the operations shown in FIG. 16. One or more of the operations shown in FIG. 16 may be performed by system 100, any components (e.g., depth scanning devices, etc.) included therein, and/or any implementation thereof.

In operation 1602, a first depth scanning device included within a depth scanning system and having a first scan head may perform a first sequence of depth scanning operations. In some examples, the first depth scanning device may be configured to be disposed on a boundary of a scan zone at a first location where a first pair of segments of the boundary meet to form a first angle that includes the scan zone. As such, in the first sequence of depth scanning operations the first depth scanning device may detect, from a first vantage point of the first location, depth data for surfaces included within the scan zone. For example, the first depth scanning device may detect the depth data by rotating, for each depth scanning operation in the first sequence of depth scanning operations, the first scan head to sweep a first scan field across the first angle. Operation 1602 may be performed in any of the ways described herein.

In operation 1604, the first depth scanning device may abstain from detecting depth data for surfaces outside the first angle during the performing of the first sequence of depth scanning operations in operation 1602. Operation 1604 may be performed in any of the ways described herein.

In operation 1606, a second depth scanning device included within the depth scanning system and having a second scan head may perform a second sequence of depth scanning operations. In some examples, the second depth scanning device may be configured to be disposed on the boundary of the scan zone at a second location where a second pair of segments of the boundary meet to form a second angle that includes the scan zone. As such, in the second sequence of depth scanning operations, the second depth scanning device may detect, from a second vantage point of the second location, additional depth data for the surfaces included within the scan zone. For example, the second depth scanning device may detect the additional depth data by rotating, for each depth scanning operation in the second sequence of depth scanning operations, the second scan head to sweep a second scan field across the second angle. In some examples, the performing of the second sequence of depth scanning operations in operation 1606 may be concurrent with the performing of the first sequence of depth scanning operations in operation 1602. Operation 1606 may be performed in any of the ways described herein.

In operation 1608, the second depth scanning device may abstain from detecting depth data for surfaces outside the second angle during the performing of the second sequence of depth scanning operations in operation 1606. Operation 1608 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 17:
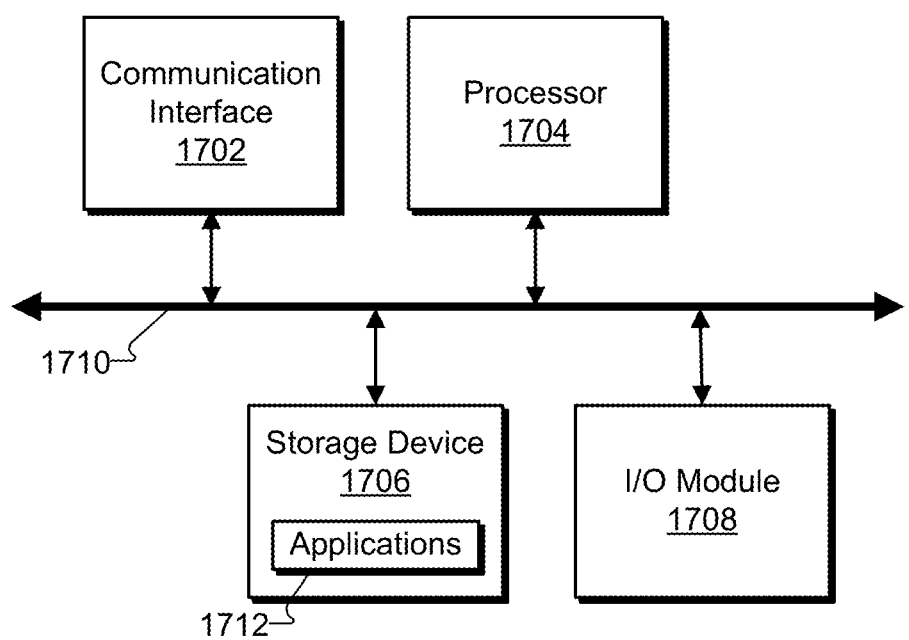
FIG. 17 illustrates an exemplary computing device according to principles described herein.

FIG. 17 illustrates an exemplary computing device 1700 that may be specifically configured to perform one or more of the processes described herein. As shown in FIG. 17, computing device 1700 may include a communication interface 1702, a processor 1704, a storage device 1706, and an input/output ("I/O") module 1708 communicatively connected via a communication infrastructure 1710. While an exemplary computing device 1700 is shown in FIG. 17, the components illustrated in FIG. 17 are not intended to be limiting. Additional or alternative components may be used in other embodiments. Components of computing device 1700 shown in FIG. 17 will now be described in additional detail.

Communication interface 1702 may be configured to communicate with one or more computing devices. Examples of communication interface 1702 include, without limitation, a wired network interface (such as a network interface card), a wireless network interface (such as a wireless network interface card), a modem, an audio/video connection, and any other suitable interface.

Processor 1704 generally represents any type or form of processing unit capable of processing data or interpreting, executing, and/or directing execution of one or more of the instructions, processes, and/or operations described herein. Processor 1704 may direct execution of operations in accordance with one or more applications 1712 or other computer-executable instructions such as may be stored in storage device 1706 or another computer-readable medium.

Storage device 1706 may include one or more data storage media, devices, or configurations and may employ any type, form, and combination of data storage media and/or device. For example, storage device 1706 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1706. For example, data representative of one or more executable applications 1712 configured to direct processor 1704 to perform any of the operations described herein may be stored within storage device 1706. In some examples, data may be arranged in one or more databases residing within storage device 1706.

I/O module 1708 may include one or more I/O modules configured to receive user input and provide user output. One or more I/O modules may be used to receive input for a single virtual reality experience. I/O module 1708 may include any hardware, firmware, software, or combination thereof supportive of input and output capabilities. For example, I/O module 1708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1700. For example, one or more applications 1712 residing within storage device 1706 may be configured to direct processor 1704 to perform one or more processes or functions associated with facilities 102 or 104 of system 100. Likewise, storage facility 106 of system 100 may be implemented by or within storage device 1706.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A depth scanning system comprising:
    a first depth scanning device having a first scan head and configured to
        be disposed on a boundary of a scan zone at a first location where a first pair of segments of the boundary meet to form a first angle that includes the scan zone,
        perform a first sequence of depth scanning operations where the first depth scanning device detects, from a first vantage point of the first location, depth data for surfaces included within the scan zone by rotating, for each depth scanning operation in the first sequence of depth scanning operations, the first scan head to sweep a first scan field across the first angle and
        aim, at a particular moment during each depth scanning operation in the first sequence of depth scanning operations, the first scan field at a second vantage point of a second location where a second pair of segments of the boundary meet to form a second angle that includes the scan zone; and
    a second depth scanning device having a second scan head and configured to
        be disposed on the boundary of the scan zone at the second location,
        perform, concurrently with the performance of the first sequence of depth scanning operations, a second sequence of depth scanning operations where the second depth scanning device detects, from the second vantage point at the second location, additional depth data for the surfaces included within the scan zone by rotating, for each depth scanning operation in the second sequence of depth scanning operations, the second scan head to sweep a second scan field across the second angle, and
        aim, at the particular moment during each depth scanning operation, the second scan field at the first vantage point of the first location.

2. The depth scanning system of claim 1, further comprising a computing device configured to:
    receive the depth data for the surfaces included within the scan zone detected by the first depth scanning device from the first vantage point;
    receive the additional depth data for the surfaces included within the scan zone detected by the second depth scanning device from the second vantage point;
    correlate the depth data and the additional depth data based on a synchronization signal included as metadata with the depth data and the additional depth data; and
    generate, based on the correlated depth data and additional depth data, a depth map of the surfaces included within the scan zone.

3. The depth scanning system of claim 2, wherein the depth map includes a representation of the surfaces included within the scan zone with respect to a three-dimensional global coordinate system and with respect to a temporal dimension.

4. The depth scanning system of claim 2, wherein the computing device is further configured to provide the depth map to a virtual reality system for use in generating and providing virtual reality media content to a media player device associated with a user, the virtual reality media content configured to be experienced, by the user and by way of the media player device, from a dynamically selectable virtual viewpoint selected by the user within a virtual reality world associated with the virtual reality media content.

5. The depth scanning system of claim 1, wherein:
    the first depth scanning device is a first light detection and ranging ("LIDAR") device; and
    the second depth scanning device is a second LIDAR device.

6. The depth scanning system of claim 1, wherein:
    the performance of the first sequence of depth scanning operations includes rotating the first scan head of the first depth scanning device in a full 360 degree rotation;
    the first depth scanning device includes
        a plurality of optic centers disposed around a perimeter of the first scan head, each optic center in the plurality of optic centers configured to rotate with the first scan head in the full 360 degree rotation, and
        a mirror disposed within the first scan head, the mirror configured to rotate independently from the first scan head; and
    during the performance of the first sequence of depth scanning operations, the mirror is configured to
        partially rotate, in phase with the rotating of the first scan head, so as to direct the first scan field to pass through a first optic center in the plurality of optic centers as the first optic center sweeps across the first angle,
        after the first optic center sweeps across the first angle and before a second optic center in the plurality of optic centers sweeps across the first angle, perform a realignment of the mirror to align the mirror with the second optic center, and
        partially rotate, in phase with the rotating of the first scan head, so as to direct the first scan field to pass through the second optic center as the second optic center sweeps across the first angle.

7. The depth scanning system of claim 6, wherein the realignment of the mirror to align the mirror with the second optic center includes a snap rotation that is out of phase with the rotating of the first scan head.

8. The depth scanning system of claim 1, wherein:
the first depth scanning device includes
an optic center disposed on a perimeter of the first scan head and configured to rotate with the first scan head, and
a mirror disposed within the first scan head and configured to rotate in phase with the rotating of the first scan head so as to direct the first scan field to pass through the optic center disposed on the perimeter of the first scan head; and
the performance of the first sequence of depth scanning operations includes
rotating the optic center and the mirror in a first rotational direction to sweep the first scan field across the first angle, and
after the optic center sweeps across the first angle, switching from rotating the optic center and the mirror in the first rotational direction to rotating the optic center and the mirror in a second rotational direction opposite to the first rotational direction to sweep the first scan field across the first angle.

9. The depth scanning system of claim 1, wherein the first and second depth scanning devices are synchronized to perform in-phase pairs of depth scanning operations where each depth scanning operation performed by the first depth scanning device as part of the first sequence of depth scanning operations is in phase with a corresponding depth scanning operation performed by the second depth scanning device as part of the second sequence of depth scanning operations.

10. The depth scanning system of claim 1, wherein:
the boundary of the scan zone forms a polygon having a plurality of sides meeting at a plurality of vertices;
the first location corresponds to a first vertex in the plurality of vertices where a first side and a second side in the plurality of sides of the polygon meet, the first pair of segments of the boundary corresponding to the first and second sides of the polygon; and
the second location corresponds to a second vertex in the plurality of vertices where the second side and a third side in the plurality of sides of the polygon meet, the second pair of segments of the boundary corresponding to the second and third sides of the polygon.

11. A depth scanning system comprising:
a first depth scanning device having a first scan head and configured to
be disposed on a rectangular boundary of a scan zone at a first vertex that forms a first angle that includes the scan zone,
perform a first sequence of depth scanning operations where the first depth scanning device detects, from a first vantage point of the first vertex, a first depth dataset for surfaces included within the scan zone by rotating, for each depth scanning operation in the first sequence of depth scanning operations, the first scan head to sweep a first scan field across the first angle, and
aim, at a particular moment during each depth scanning operation in the first sequence of depth scanning operations, the first scan field at a second vantage point of a second vertex that forms a second angle that includes the scan zone;

a second depth scanning device having a second scan head and configured to
be disposed on the rectangular boundary of the scan zone at the second vertex,
perform, concurrently with the performance of the first sequence of depth scanning operations, a second sequence of depth scanning operations where the second depth scanning device detects, from the second vantage point of the second vertex, a second depth dataset for the surfaces included within the scan zone by rotating, for each depth scanning operation in the second sequence of depth scanning operations, the second scan head to sweep a second scan field across the second angle, and
aim, at the particular moment during each depth scanning operation, the second scan field at the first vantage point of the first vertex;
a third depth scanning device having a third scan head and configured to
be disposed on the rectangular boundary of the scan zone at a third vertex that forms a third angle that includes the scan zone, and
perform, concurrently with the performance of the first and second sequences of depth scanning operations, a third sequence of depth scanning operations where the third depth scanning device detects, from a third vantage point of the third vertex, a third depth dataset for the surfaces included within the scan zone by rotating, for each depth scanning operation in the third sequence of depth scanning operations, the third scan head to sweep a third scan field across the third angle; and
a fourth depth scanning device having a fourth scan head and configured to
be disposed on the rectangular boundary of the scan zone at a fourth vertex that forms a fourth angle that includes the scan zone, and
perform, concurrently with the performance of the first and second and third sequences of depth scanning operations, a fourth sequence of depth scanning operations where the fourth depth scanning device detects, from a fourth vantage point of the fourth vertex, a fourth depth dataset for the surfaces included within the scan zone by rotating, for each depth scanning operation in the fourth sequence of depth scanning operations, the fourth scan head to sweep a fourth scan field across the fourth angle.

12. The depth scanning system of claim 11, further comprising a computing device configured to:
receive the first depth dataset for the surfaces included within the scan zone detected by the first depth scanning device from the first vantage point;
receive the second depth dataset for the surfaces included within the scan zone detected by the second depth scanning device from the second vantage point;
receive the third depth dataset for the surfaces included within the scan zone detected by the third depth scanning device from the third vantage point;
receive the fourth depth dataset for the surfaces included within the scan zone detected by the fourth depth scanning device from the fourth vantage point;
correlate the first, second, third, and fourth depth datasets based on a synchronization signal included as metadata with each of the first, second, third, and fourth depth datasets; and generate, based on the correlated first, second, third, and fourth depth datasets, a depth map of the surfaces included within the scan zone.

13. A method comprising:

performing, by a first depth scanning device included within a depth scanning system and having a first scan head and configured to be disposed on a boundary of a scan zone at a first location where a first pair of segments of the boundary meet to form a first angle that includes the scan zone, a first sequence of depth scanning operations where the first depth scanning device detects, from a first vantage point of the first location, depth data for surfaces included within the scan zone by rotating, for each depth scanning operation in the first sequence of depth scanning operations, the first scan head to sweep a first scan field across the first angle;

aiming, by the first depth scanning device at a particular moment during each depth scanning operation in the first sequence of depth scanning operations, the first scan field at a second vantage point of a second location where a second pair of segments of the boundary meet to form a second angle that includes the scan zone;

performing, by a second depth scanning device included within the depth scanning system and having a second scan head and configured to be disposed on the boundary of the scan zone at the second location, a second sequence of depth scanning operations where the second depth scanning device detects, from the second vantage point at the second location, additional depth data for the surfaces included within the scan zone by rotating, for each depth scanning operation in the second sequence of depth scanning operations, the second scan head to sweep a second scan field across the second angle, the performing of the second sequence of depth scanning operations concurrent with the performing of the first sequence of depth scanning operations; and aiming, by the second depth scanning device at the particular moment during each depth scanning operation, the second scan field at the first vantage point of the first location.

14. The method of claim 13, further comprising:

receiving, by a computing device included within the depth scanning system, the depth data for the surfaces included within the scan zone detected by the first depth scanning device from the first vantage point;

receiving, by the computing device, the additional depth data for the surfaces included within the scan zone detected by the second depth scanning device from the second vantage point;

correlate the depth data and the additional depth data based on the synchronization signal included as metadata with the depth data and the additional depth data; and generating, by the computing device based on the correlated depth data and additional depth data, a depth map of the surfaces included within the scan zone.

15. The method of claim 14, wherein the depth map includes a representation of the surfaces included within the scan zone with respect to a three-dimensional global coordinate system and with respect to a temporal dimension.

16. The method of claim 13, wherein:

the performing of the first sequence of depth scanning operations includes rotating the first scan head of the first depth scanning device in a full 360 degree rotation;

the first depth scanning device includes
a plurality of optic centers disposed around a perimeter of the first scan head and each configured to rotate with the first scan head in the full 360 degree rotation, and
a mirror disposed within the first scan head and configured to rotate independently from the first scan head; and during the performing of the first sequence of depth scanning operations, the mirror is configured to
partially rotate, in phase with the rotating of the first scan head, so as to direct the first scan field to pass through a first optic center in the plurality of optic centers as the first optic center sweeps across the first angle,
after the first optic center sweeps across the first angle and before a second optic center in the plurality of optic centers sweeps across the first angle, perform a realignment of the mirror to align the mirror with the second optic center, and
partially rotate, in phase with the rotating of the first scan head, so as to direct the first scan field to pass through the second optic center as the second optic center sweeps across the first angle.

17. The method of claim 13, wherein:

the first depth scanning device includes
an optic center disposed on a perimeter of the first scan head and configured to rotate with the first scan head, and
a mirror disposed within the first scan head and configured to rotate in phase with the rotating of the first scan head so as to direct the first scan field to pass through the optic center disposed on the perimeter of the first scan head; and the performing of the first sequence of depth scanning operations includes
rotating the optic center and the mirror in a first rotational direction to sweep the first scan field across the first angle, and
after the optic center sweeps across the first angle, switching from rotating the optic center and the mirror in the first rotational direction to rotating the optic center and the mirror in a second rotational direction opposite to the first rotational direction to sweep the first scan field back across the first angle.

18. The method of claim 13, wherein the performing of the depth scanning operations in the first and second sequences of depth scanning operations by the first and second depth scanning devices is synchronized to include in-phase pairs of depth scanning operations where each depth scanning operation performed by the first depth scanning device as part of the first sequence of depth scanning operations is in phase with a corresponding depth scanning operation performed by the second depth scanning device as part of the second sequence of depth scanning operations.

19. The method of claim 13, wherein:

the boundary of the scan zone forms a polygon having a plurality of sides meeting at a plurality of vertices;

the first location corresponds to a first vertex in the plurality of vertices where a first side and a second side in the plurality of sides of the polygon meet, the first pair of segments of the boundary corresponding to the first and second sides of the polygon; and the second location corresponds to a second vertex in the plurality of vertices where the second side and a third side in the plurality of sides of the polygon meet, the second pair of segments of the boundary corresponding to the second and third sides of the polygon.

20. The method of claim 13, embodied as computer-executable instructions on at least one non-transitory computer-readable medium.

\* \* \* \* \*